United States Patent
Garwood

(10) Patent No.: US 10,820,601 B2
(45) Date of Patent: *Nov. 3, 2020

(54) METHOD FOR SEPARATING BONE FRAGMENTS AND TALLOW FROM A SINGLE INGREDIENT STREAM OF BEEF BY CONTROLLING THE FROZEN CONDITION OF THE BEEF AND IMMERSING IN CARBONIC ACID AT ELEVATED PRESSURES

(71) Applicants: SafeFresh Technologies, LLC, Mercer Island, WA (US); Julie C. Garwood, Mercer Island, WA (US)

(72) Inventor: Anthony J. M. Garwood, Mercer Island, WA (US)

(73) Assignee: SafeFresh Technologies, LLC., Mercer Island, WA (US)

(*) Notice: Subject to any disclaimer, the term of this patent is extended or adjusted under 35 U.S.C. 154(b) by 594 days.

This patent is subject to a terminal disclaimer.

(21) Appl. No.: 15/356,388

(22) Filed: Nov. 18, 2016

(65) Prior Publication Data

US 2017/0064970 A1    Mar. 9, 2017

Related U.S. Application Data

(63) Continuation of application No. 13/024,178, filed on Feb. 9, 2011, now Pat. No. 9,497,985.

(Continued)

(51) Int. Cl.
*A22C 17/08* (2006.01)
*A22C 17/04* (2006.01)
(Continued)

(52) U.S. Cl.
CPC ............ *A22C 17/08* (2013.01); *A22C 17/04* (2013.01); *A23B 4/09* (2013.01); *A23L 5/20* (2016.08); *A23L 13/00* (2016.08); *A23V 2002/00* (2013.01)

(58) Field of Classification Search
CPC . A23L 13/00; A23L 13/60; A23L 5/23; A23B 7/0408

(Continued)

(56) References Cited

U.S. PATENT DOCUMENTS 3,780,191 A    12/1973 Langer
4,201,302 A *  5/1980 Roth .................... A22C 17/008
                                                    209/577

(Continued)

FOREIGN PATENT DOCUMENTS

DE    26 28 858 A1    12/1977
EP    0 356 165 B1    2/1990

(Continued)

OTHER PUBLICATIONS

Spilimbergo, S., and A. Bertucco, "Non-Thermal Bacterial Inactivation With Dense $CO_2$," Biotechnology and Bioengineering 84(6):627-638, Dec. 2003.

(Continued)

*Primary Examiner* — Vera Stulii
(74) *Attorney, Agent, or Firm* — Christensen O'Connor Johnson Kindness PLLC

(57) ABSTRACT

A method for the separation of fat from meat. The method includes providing individual pieces of meat containing lean and fat; subjecting the individual pieces of meat to cooling for a time sufficient to produce a difference in temperature between the fat and lean, wherein the fat is cooled such that the fat is friable and crumbles into finer particulates when subjected to a crushing force and the lean is cooled to a (Continued)

higher temperature than the fat and the lean is able to withstand a similar crushing force without substantially crumbling into smaller particulates; and with the fat and lean at the temperatures produced, subjecting the individual pieces of meat to a crushing force to separate particulates of fat from the individual pieces of meat.

15 Claims, 10 Drawing Sheets

Related U.S. Application Data

(60) Provisional application No. 61/302,802, filed on Feb. 9, 2010.

(51) Int. Cl.
*A23B 4/09* (2006.01)
*A23L 13/00* (2016.01)
*A23L 5/20* (2016.01)

(58) Field of Classification Search
USPC .......................................... 426/480, 478, 417
See application file for complete search history.

(56) References Cited

U.S. PATENT DOCUMENTS

| | | | |
|---|---|---|---|
| 5,147,672 A | 9/1992 | McLachlan | |
| 5,215,772 A * | 6/1993 | Roth | A22C 17/002 |
| | | | 209/577 |
| 5,378,418 A | 1/1995 | Berger | |
| 5,393,547 A | 2/1995 | Balaban | |
| 5,435,443 A | 7/1995 | Hohenester | |
| 5,458,901 A | 10/1995 | Engler | |
| 5,552,171 A | 9/1996 | Gibney | |
| 5,552,173 A | 9/1996 | Singh | |
| 5,965,184 A | 10/1999 | Schaefer | |
| 6,036,630 A | 3/2000 | Robey | |
| 6,123,945 A | 9/2000 | Nakatsu | |
| 6,172,246 B1 | 1/2001 | Franke | |
| 6,183,795 B1 * | 2/2001 | Yates | A23B 7/00 |
| | | | 426/385 |
| 6,224,930 B1 | 5/2001 | Inglis | |
| 6,265,006 B1 | 7/2001 | Inglis | |
| 7,666,456 B2 | 2/2010 | Garwood | |
| 8,859,025 B2 * | 10/2014 | Garwood | A23B 4/015 |
| | | | 426/248 |
| 9,167,843 B2 * | 10/2015 | Garwood | A23L 13/00 |
| 9,497,985 B2 * | 11/2016 | Garwood | A22C 17/04 |
| 2001/0007690 A1 | 7/2001 | Girsh | |
| 2002/0134317 A1 | 9/2002 | Shane | |
| 2005/0042346 A1 | 2/2005 | Garwood | |
| 2009/0214730 A1 | 8/2009 | Garwood | |
| 2009/0214733 A1 | 8/2009 | Garwood | |
| 2010/0112168 A1 | 5/2010 | Garwood | |
| 2011/0008505 A1 | 1/2011 | Garwood | |
| 2012/0231148 A1 * | 9/2012 | Garwood | A22C 17/04 |
| | | | 426/641 |

FOREIGN PATENT DOCUMENTS

| | | |
|---|---|---|
| EP | 1 967 082 A1 | 9/2008 |
| GB | 357207 | 9/1931 |
| JP | 58-212740 A | 12/1983 |
| WO | 91/05502 A1 | 5/1991 |
| WO | 03/101210 A1 | 12/2003 |
| WO | 2008/085715 A2 | 7/2008 |

OTHER PUBLICATIONS

CO2 phase diagram downloaded from the internet at <http://www.teamonslaught.fsnet.co.uk/co2_info.htm., posted on the internet on May 4, 2007.
International Search Report and Written Opinion of the International Search Authority dated Dec. 27, 2012, issued in related International Application No. PCT/US2012/041018, filed Jun. 6, 2012, 12 pages.

* cited by examiner

|   | DATE | TIME | DELTA T' | DELTA T | TEMPERATURE FAT | LEAN |
|---|------|------|----------|---------|------|------|
| 1 | 8/3/2010 | 3:31:00 PM | 0:00 | 0:00 | 5.2 | 29.0 |
| 2 |  | 3:37:00 PM | 0:06 | 0:06 | 27.9 | 26.6 |
| 3 |  | 3:43:00 PM | 0:06 | 0:12 | 29.5 | 26.9 |
| 4 |  | 3:50:00 PM | 0:07 | 0:19 | 30.9 | 27.8 |
| 5 |  | 3:58:00 PM | 0:08 | 0:27 | 29.7 | 28.6 |
| 6 |  | 4:03:00 PM | 0:05 | 0:32 | 30.6 | 28.9 |
| 7 |  | 4:14:00 PM | 0:11 | 0:43 | 31.0 | 29.5 |
| 8 |  | 4:22:00 PM | 0:08 | 0:51 | 32.8 | 29.8 |
| 9 |  | 4:31:00 PM | 0:09 | 1:00 | 33.3 | 30.0 |
| 10 |  | 4:36:00 PM | 0:05 | 1:05 | 35.3 | 30.0 |

METHOD FOR SEPARATING BONE FRAGMENTS AND TALLOW FROM A SINGLE INGREDIENT STREAM OF BEEF BY CONTROLLING THE FROZEN CONDITION OF THE BEEF AND IMMERSING IN CARBONIC ACID AT ELEVATED PRESSURES

CROSS-REFERENCES TO RELATED APPLICATIONS

This application is a continuation of U.S. patent application Ser. No. 13/024,178, filed Feb. 9, 2011 (now U.S. Pat. No. 9,497,985), which claims the benefit of U.S. Provisional Application No. 61/302,802, filed Feb. 9, 2010, the disclosures of both of which are fully incorporated herein expressly by reference.

BACKGROUND

Reduction of *E. Coli.* 0157:H7 to undetectable populations in fresh ground beef has proven to be a difficult problem for the beef industry to overcome. The random, infrequent detection of the pathogens presence plagues consumers and the industry alike. Fresh ground beef is an important staple of the US consumers' diet, and its elimination is out of the question. In fact, in spite of the justifiable concern about continued contamination of ground beef, there are other fresh foods, such as vegetables and fruits, that likely have a greater incidence of pathogen contamination. Identifying a consistently reliable, consumer acceptable, and cost-effective method of achieving undetectable pathogen populations in fresh ground beef has not been successful.

The U.S. distribution system, via which fresh beef products are delivered to American consumers must operate flawlessly, with precise refrigeration control, distribution, and inventory management to avoid significant spoilage bacteria and metmyoglobin discoloration losses. Refrigeration control in trucks has improved significantly but still some 14% of total available value is lost by retailers in the form of mark-downs and unsaleable items having lost adequate consumer appeal, even at marked down prices.

While the U.S. distribution system is more than adequate to provide for the timely delivery of consumer beef products comprising some 86% of the value of beef consumed in the USA, the remaining 14% of lost value will remain unresolved until an improved system addresses the causes. Unfortunately, it is not always the same beef products that combine to create this 14% loss. The loss can comprise any beef items produced, but providing a reliable, adequate storage/shelf life extension for all items will resolve many of the current system shortcomings. In the battle against the combined forces that cause the 14% loss of value, it is not just the steady but relentless spoilage bacterial putrefaction effects. The 14% loss in value is often exceeded due to the consequences of pathogenic contamination of any beef products and the simple metmyoglobin discoloration of what was once bright red fresh beef adds more loss.

Metmyoglobin discoloration can be a good indicator of a lack of freshness in beef, which is why eliminating this natural indicator with the cherry red color fixing properties of carbon monoxide is an unacceptable practice to resolve the discoloration problem. Additionally, a confounding phenomenon results in premature metmyoglobin discoloration when oxygen contacting the beef comprises between about 3,000 to 30,000 ppm of any modified atmosphere contained in a package irrespective of beef age and even when the beef is still fresh. This represents another loss factor that needs resolution if the full benefits of anoxic case ready packaging are to be a benefit.

The ground beef industry uses grinding equipment that doesn't just grind the beef; the equipment emulsifies a significant proportion of the throughput that can provide protection to pathogens that become enclosed in the emulsified beef. Immediately following grinding, massive blenders that are very efficient at blending, quickly entrain atmospheric oxygen into the beef by exposing to atmosphere what was, just prior to grinding, dedoxymyoglobin, to which oxygen molecules quickly attach to produce bright red oxymyoglobin. If this "oxygenated" ground beef is then packaged in an anoxic case ready package the entrained oxygen is released (due to the lower O2 partial pressure) and will in every instance increase the oxygen content of an anoxic atmosphere to the range between 3,000 to 30,000 ppm and the resultant deleterious effects described above.

Large quantities of generally high lean content boneless beef are imported from countries such as Australia, New Zealand and Canada. The substantially disease free Australian cattle production environment combined with exceptionally well operated slaughtering facilities, has evolved to be the favored source of high lean content boneless beef for ground beef production. However, 8,000 miles of ocean separate the USA from Australia. There should be a way to displace these imports with more beef produced in the USA. A primary driver for the Australian and New Zealand high lean beef imports is the need to accommodate the large quantities of high fat content beef trim (of approximately 50% to 73% fat) comprising some 35% to 40% of U.S. sourced ground beef raw materials, by combining high lean imports with locally produced high fat content boneless beef thereby diluting the high fat content of the locally produced boneless beef.

Hohenester et al describe a method of separation for meat in U.S. Pat. No. 5,435,443 and the disclosure provides a series of temperature ranges with corresponding pressure ranges. Hohenester et al. claim that a mixture of liquefied carbon dioxide and water-containing substances such as meat can be used to separate fat from lean by flotation and sedimentation. The temperature ranges indicated are below the freezing point of water, for example, negative 10° C., 13° C., 14° C. and 20° C. at between 15 and 50 Bar and are recited as temperatures that are below the freezing point of water and at which the density of liquid carbon dioxide can be adjusted to correspond to that of water so that water-containing substances of the mixture can be readily separated. However, water expands when frozen and water containing substances such as beef comprises some 70% water in the lean component and 10% water in tallow. The expansion of water when frozen reduces its density from 62.4 lbs per cubic foot to about 57 lbs per cubic foot, which is similar to the density of fat. At about the temperature when water freezes, the density of liquefied carbon dioxide is about 57.8 lbs per cubic foot and at 36° F. the density of liquefied carbon dioxide is about 56.9 lbs per cubic foot. Also, the majority of fat contains at least a small amount of lean and the majority lean contains a small amount of fat. Furthermore, the water content of meat varies by at least a few percentage points due to many factors including inconsistent dehydration after animal slaughter and disassembly. All of the above factors render the method of separating fat from lean using pure, liquefied carbon dioxide too inconsistent to be commercially reliable.

A need therefore still exists to more efficiently separate the lower value tallow with fat from the higher value lean beef contained in trim and to more effectively kill, reduce, or completely remove the microbial pathogenic population and to eliminate sources of cross contamination and recontamination, while also producing a ground beef product of specific fat content.

SUMMARY

Disclosed are methods relating to the reduction in the tallow content and/or the separation of tallow and/or fat from materials, particularly in foods for human consumption, including fresh, uncooked meats and in particular beef.

Beef tallow comprises natural proportions of beef fat, collagen, and connective tissue, while beef fat is a single component contained within beef tallow. Disclosed herein is a method and apparatus for separating lean from fat contained within the lean component without destruction of the muscle striations or reduction to small lean particulates. The method includes freezing at least the fat component of the beef to a temperature causing solidification of the fat and to a brittle condition so that when a gentle crushing action is applied to the frozen pieces of beef the crushing force is sufficient to cause fracturing and the substantial disintegration or fragmentation of the fat component into small fat particulates or fragments that readily fall away from the lean, but without significantly damaging the lean component. The frozen and crushed stream of beef particulates can then be transferred to a vibratory separator, which can separate a portion of the fat particulates while agitating and shaking the larger lean pieces so as to cause even more fat particulates to separate from the larger lean pieces. Then, the separated fat particulates and larger lean pieces can be combined with a fluid that comprises carbon dioxide and/or water. The ground beef and fluid are transferred into to a vessel. The beef and the fluid are agitated in the vessel. The beef comprises relative light and heavy components. The heavy components that are predominantly lean beef, when at least partially unfrozen such that its density has increased to a value above 62.4 lbs per cubic foot, can then settle to the bottom of the fluid and the light components that are predominantly tallow and fat can rise toward the surface of the fluid. The separated components comprising predominantly lean beef can be removed from the fluid as a reduced tallow and fat content ground beef product. The method can be practiced with any material containing fat, including plants and animals.

The fluid can include carbon dioxide and water. When pressurized, the fluid can have a pH of about 3 or higher, or even lower, such that when the beef is blended in the fluid for a period of time, any bacteria that is present at the beef surfaces is either killed or injured. Furthermore, the processing of the beef in a substantially all carbon dioxide environment around the beef extends the shelf life of the beef by at least displacing oxygen from contacting the beef surfaces.

A first embodiment of the invention is related to a method for dividing a quantity of food such as beef into components of fat and lean; and, separating bone fragments from the beef. The method includes slicing, dicing, flaking and/or chipping beef into smaller beef particulates and freezing the beef particulates, with bone fragments by reducing the temperature to below 29.5° F.; combining the frozen beef with fluid at a temperature above 32° F., in a vessel; agitating the frozen beef and fluid in the vessel; allowing bone fragments within the beef particulates to sink to the bottom of the fluid and isolating the bone fragments below a separating member such as a horizontally disposed gate valve which is closed after bone fragments have sunk below the separating member but before the temperature of the frozen beef particulates, comprising predominantly lean beef, increases to above the freezing point of water contained in the beef such that the more dense lean particulates sink to the lower region but above the bone isolating member; allowing fat to rise to the upper region of the fluid in the vessel; removing the beef particulates comprising predominantly fat from the fluid; and removing the beef particulates comprising predominantly lean beef from the fluid.

A second embodiment of the invention is related to a method for separating bone fragments and beef fat from frozen lean beef particulates. The method includes combining frozen beef particulates at a temperature below 29.5° F. with a fluid at a temperature above 32° F., wherein the fluid has a density that is greater than the density of the higher lean content frozen particulates when the temperature of the particulates at the point of combining is lower than the temperature of the fluid and, after time, below the density of the same higher lean content particulates when the temperature of the particulates and the fluid have equilibrated and are about the same temperature with the fluid temperature remaining above 32° F.; and the formerly frozen, leaner beef particulates are no longer frozen; allowing bone fragments, having a density greater than the density of the fluid, to sink in the fluid (before the temperature of the leaner beef particulates has equilibrated to an unfrozen condition); closing a valve above the bottom of the vessel to isolate the bone fragments while the leaner beef particulates, after becoming unfrozen, are still above the level of the closed valve; allowing the leaner beef particulates having a density greater than the density of the fluid to sink in the fluid and the particulates with a density less than the density of the fluid to rise in the fluid; and separating the particulates that rise into a material fraction that is predominantly fat. In the second embodiment, the fluid can comprise water.

A third embodiment of the invention is related to a method for separating fat from lean in beef (meat) by fracturing frozen, size reduced, beef pieces which comprise a fat component and a lean component. The method includes providing a quantity of boneless beef and then slicing, dicing, flaking and/or chipping the boneless beef pieces into smaller beef pieces; freezing the beef pieces, by reducing the temperature to below 29° F.; transferring the size reduced frozen beef pieces to a crushing apparatus and applying a crushing force greater than 25 psi across the frozen beef pieces so as to fracture the fat component thereby enabling the fractured fat to detach from the lean component, of each piece of beef, to which the fat was previously attached to provide small pieces of separated fractured fat and larger pieces of lean wherein all finished pieces of fat and lean are smaller than the frozen pieces of beef prior to applying the crushing force to the beef pieces.

A fourth embodiment of the invention relates to an apparatus for separation of fat particles, lean particles, and optionally bone fragments, produced by the method of the third embodiment. The apparatus includes a first, second, third, fourth, and fifth vessel, wherein the first vessel is connected to the second and third vessel, wherein the bottoms of the second and third vessels are at an elevation higher than the bottom of the first vessel and means are provided to seal the second and third vessels from the first vessel; the fourth vessel is connected to the first vessel so that the bottom of the fourth vessel is lower in elevation than the bottom of the first vessel and means are provided to seal the fourth vessel from the first vessel; the fifth vessel is connected to the fourth vessel so that the bottom of the fifth vessel is lower in elevation than the bottom of the fourth vessel and means are provided to seal the fifth vessel from the fourth vessel; and means to seal the bottom of the fifth vessel.

In the apparatus of the fourth embodiment, the bottom of the third vessel is higher in elevation than the bottom of the second vessel. In the apparatus of the fourth embodiment, fat or tallow is collected in the second vessel.

In the apparatus of the fourth embodiment, a mixture of carbon dioxide, fat, lean meat and bone are provided in the third vessel and then allowed to settle.

In the apparatus of the fourth embodiment, bones or bone fragments are collected in the fifth vessel.

In the apparatus of the fourth embodiment, lean meat is collected in the fourth vessel.

In the apparatus of the fourth embodiment, carbon dioxide is collected in the first vessel.

A fifth embodiment of the invention relates to a method for the separation of fat from meat. The method includes providing individual pieces of meat containing lean and fat; subjecting the individual pieces of meat to cooling for a time sufficient to produce a difference in temperature between the fat and lean, wherein the fat is cooled such that the fat is friable and crumbles into finer particulates when subjected to a crushing force and the lean is cooled to a higher temperature than the fat and the lean is able to withstand a similar crushing force without substantially crumbling into smaller particulates; and with the fat and lean at the temperatures produced in step (b), subjecting the individual pieces of meat to a crushing force to separate particulates of fat from the individual pieces of meat.

In the method of the fifth embodiment, after subjecting the individual pieces of meat to cooling, the temperature at the surface of the fat is 5° F. to 10° F.

In the method of the fifth embodiment, after subjecting the individual pieces of meat to cooling, the temperature at the surface of the lean is 16° F. to about 34° F.

In the method of the fifth embodiment, the time of cooling the individual pieces of meat is approximately 2 minutes to 3 minutes.

In the method of the fifth embodiment, the method can further comprise transferring the individual pieces of meat and separated particulates of fat to a vessel and filling the vessel with a fluid comprising, at least, carbon dioxide, and allowing the particulates of fat to rise in the fluid and allowing the individual pieces of meat to sink in the fluid, followed by collecting the fat and the individual pieces of meat.

In the method of the fifth embodiment, the method may further comprise allowing bone to sink in the fluid to a lower elevation as compared to an elevation attained by the individual pieces of meat.

In the method of the fifth embodiment, the method may further comprise transferring the individual pieces of meat and separated particulates of fat within a conduit filled with a fluid comprising, at least, carbon dioxide, and allowing the particulates of fat to rise in the fluid and allowing the individual pieces of meat to sink in the fluid while the fluid travels in the conduit, followed by collecting the fat and the individual pieces of meat.

In the method of the fifth embodiment, the method may further comprise subjecting the individual pieces of meat to a crushing force produced by intermeshing teeth on a continuous conveyor belt to separate particulates of fat from the individual pieces of meat.

In the method of the fifth embodiment, the method may further comprise, after separating the particulates of fat from the individual pieces of meat, combining a measured portion of the fat particulates with a measured portion of the individual pieces of meat to achieve a predetermined fat content for the meat.

In the method of the fifth embodiment, the method may further comprise cutting raw meat to a size not exceeding 2 inches in any dimension to produce the individual pieces of meat of step (a).

In the method of the fifth embodiment, after producing the individual pieces of meat, the pieces are cooled to minimize agglomeration of pieces into frozen masses comprising a plurality of pieces.

In the method of the fifth embodiment, the individual pieces of meat produced after separation of the fat will comprise predominantly lean meat.

In the method of the fifth embodiment, the method may further comprise contacting the separate particulates of fat and individual pieces of meat with a flowing liquid comprising, at least, carbonic acid, in a conduit, and allowing frozen water in the individual pieces of meat to thaw and increase in density which causes the individual pieces of meat to fall in the flowing liquid, while the fat particulates are buoyant in the liquid, and collecting the individual pieces of meat in a lower conduit of a manifold and collecting the fat particulates in an upper conduit of the manifold.

In the method of the fifth embodiment, the method may further comprise separating the liquid from the individual pieces of meat and fat particulates, weighing the fat, and combining a portion of the fat with the individual pieces of meat to produce a meat product of predetermined fat content.

In the method of the fifth embodiment, the method may further comprise centrifuging the individual pieces of meat and fat particulates to remove the liquid, weighing the individual pieces of meat in a first conveyor and, weighing the fat particulates in a second conveyor.

A sixth embodiment of the invention is related to a method for deactivating pathogens in meat. The method includes transferring meat to a vessel, wherein the vessel includes an enclosed elongated space fitted with a first and a second piston within the interior of the space at each of two opposing ends, and the pistons include a front and back side; charging the vessel with carbon dioxide; moving the first and second piston in a direction toward each other so as to reduce the volume of the space and increase the pressure within the space to create a super critical carbon dioxide phase in the space containing the meat; holding the super critical pressure of carbon dioxide for a predetermined period of time; after holding the super critical pressure for the predetermined period of time, moving the first and the second pistons away from each other to reduce the pressure in the space to a subcritical pressure of carbon dioxide; holding the subcritical pressure of carbon dioxide for a predetermined period of time; and after holding the subcritical pressure of carbon dioxide, moving the first and second pistons in a direction toward each other so as to reduce the volume of the space while expelling the carbon dioxide from the space in front of the pistons to spaces created at the back of the pistons.

In the method of the sixth embodiment, the front side of the first and the second piston is fitted with an impeller that rotates as the first and second pistons move toward each other.

In the method of the sixth embodiment, the vessel includes a central longitudinal axis, and the vessel is rotated back and forth on the axis while the first and second pistons move toward each other.

In the method of the sixth embodiment, the method may comprise performing a plurality of super critical carbon dioxide phases alternating with subcritical carbon dioxide phases before expelling the carbon dioxide.

In the method of the sixth embodiment, the super critical pressure produced is 1,500 psi or greater.

In the method of the sixth embodiment, the subcritical pressure produced is 900 psi or less.

DESCRIPTION OF THE DRAWINGS

The foregoing aspects and attendant advantages will become more readily appreciated as the same become better understood by reference to the following detailed description, when taken in conjunction with the accompanying drawings, wherein.

DETAILED DESCRIPTION

The term "fat" as used herein can mean fat and tallow when used in reference to animal matter such as beef particulates. Throughout the description "beef" is used as a representative material that can be used in the disclosed methods. However, it is to be appreciated that the disclosed methods can be practiced not only on beef, but on any meat, such as from poultry, pork, and seafood.

Figure 1:
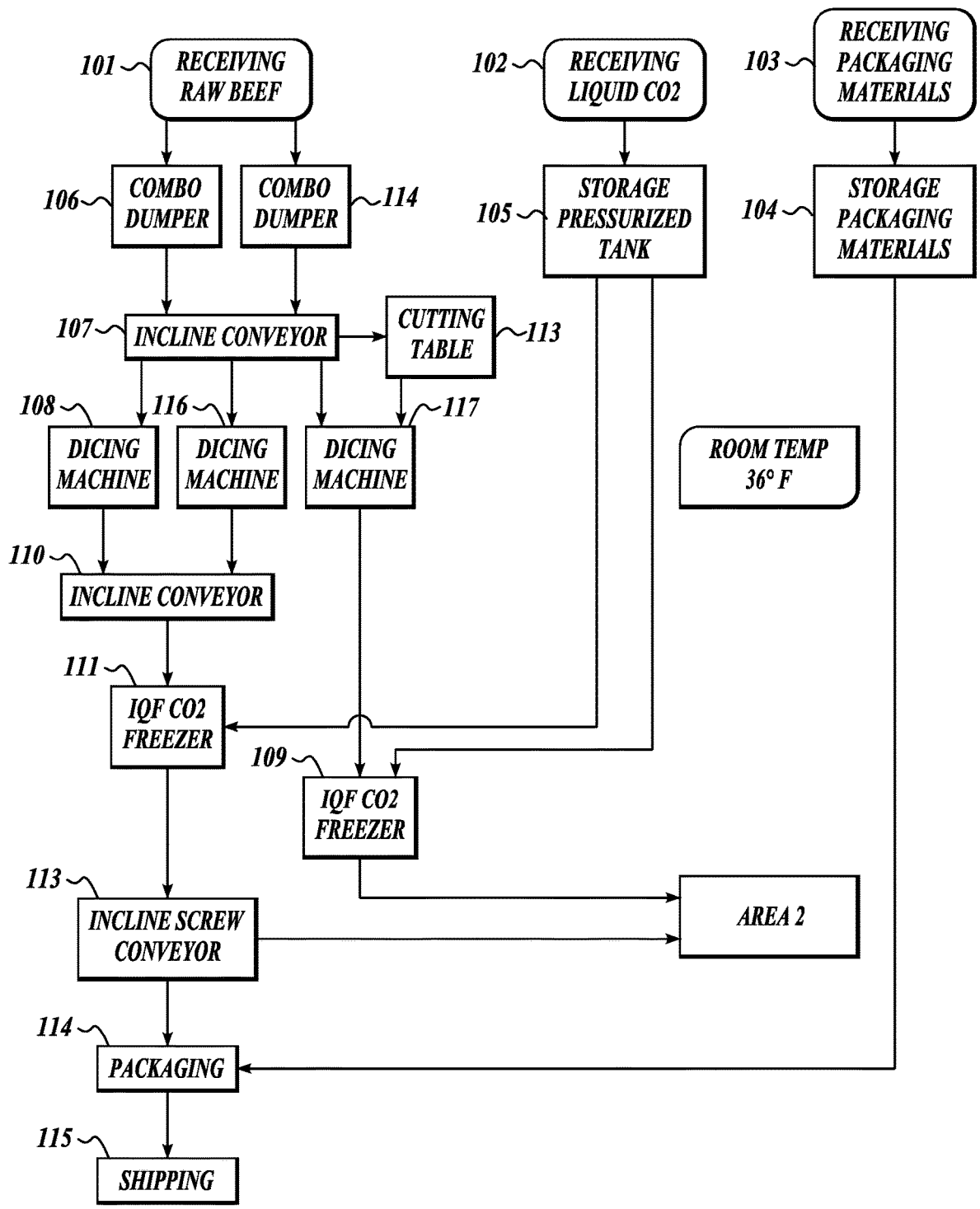
FIG. 1 is a flow diagram illustrating the layout configuration of a production facility with apparatus for processing beef into smaller particulates, separating fat from a the beef and reducing any pathogen population that may exist with the beef.
Figure 2:
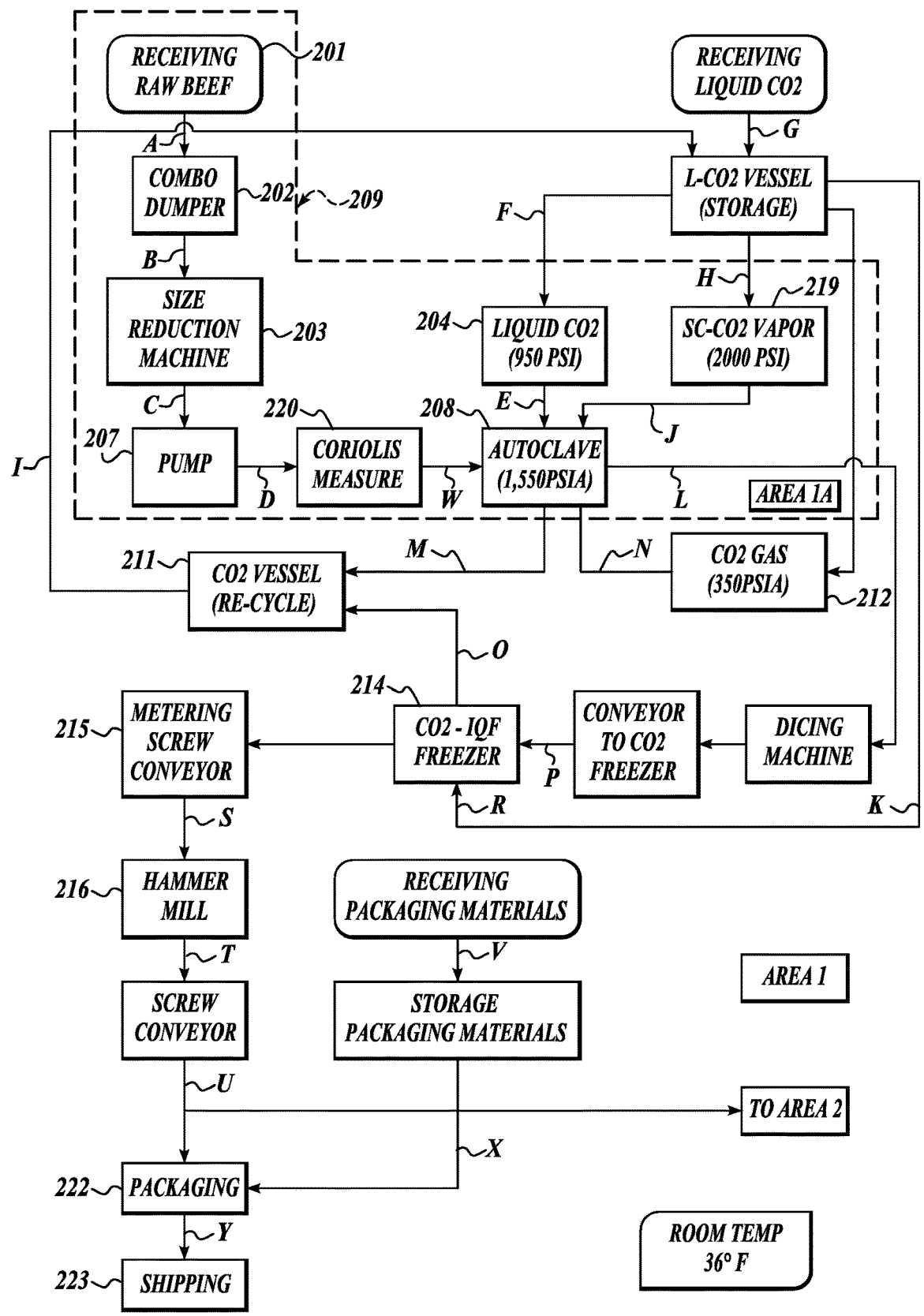
FIG. 2 is a flow diagram detailing the production process for separation of lean beef from fat.
Figure 3:
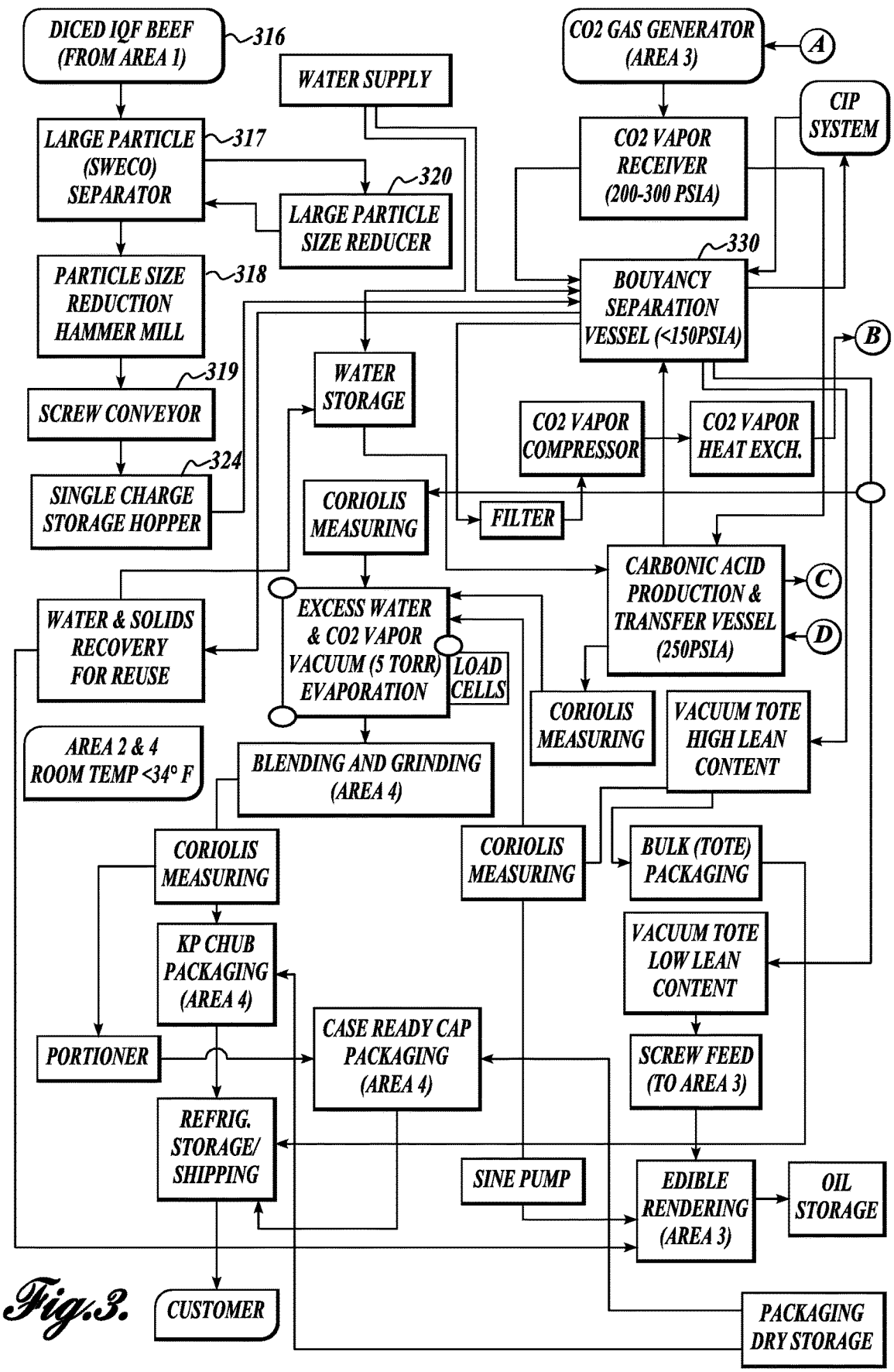
FIG. 3 is a flow diagram of an arrangement of an apparatus for separating fat from a material.
Figure 3:
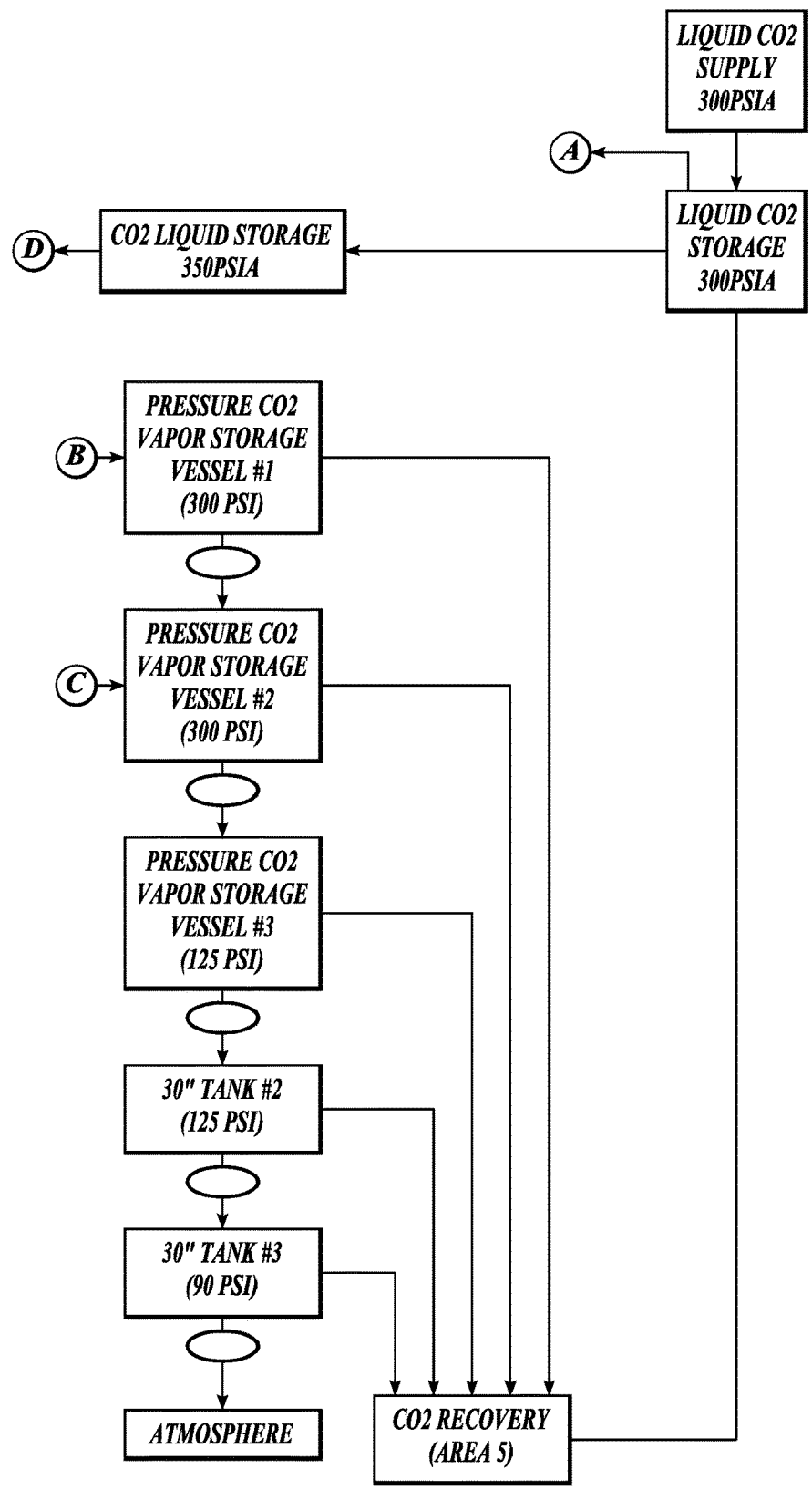
Figure 4:
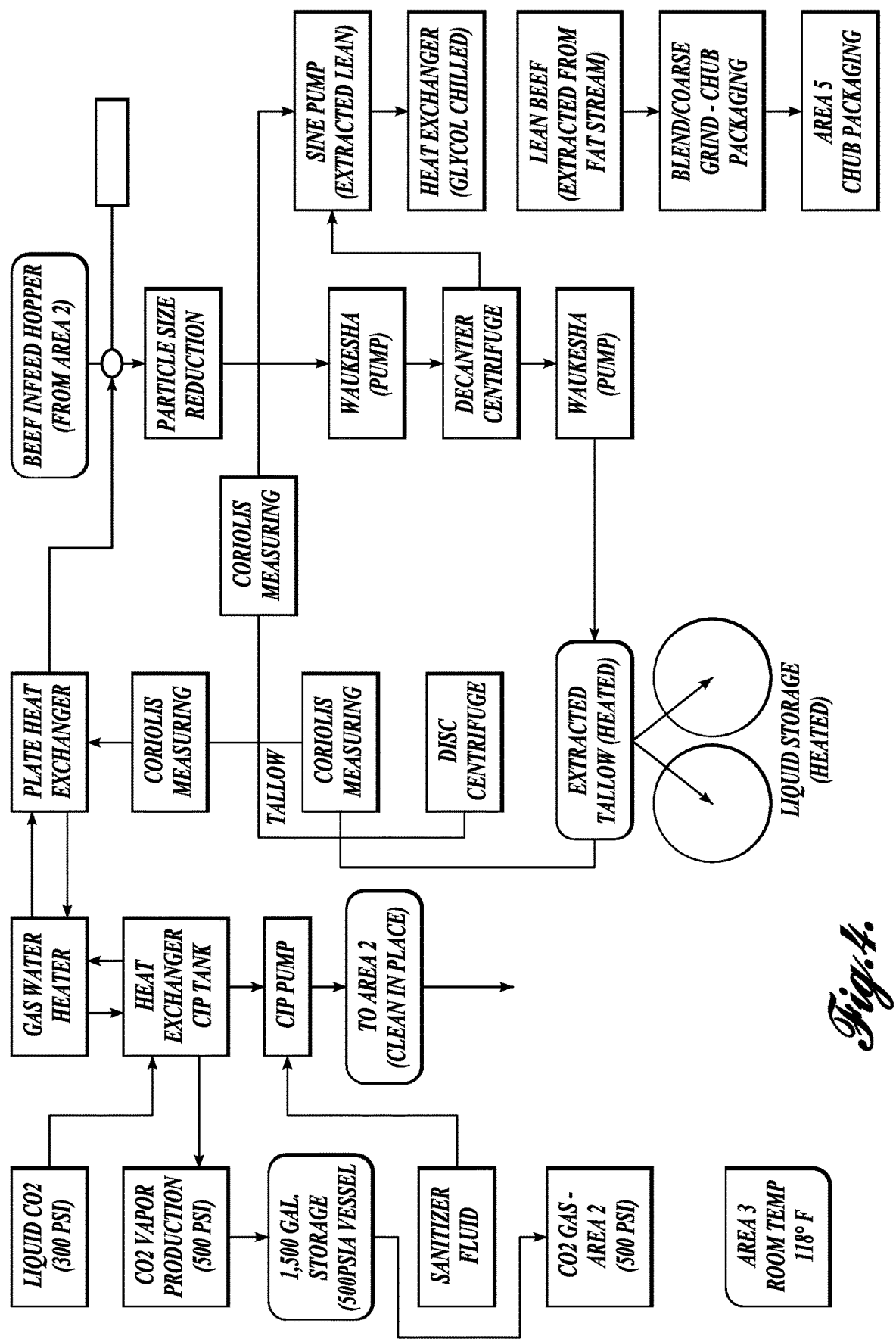
FIG. 4 is a flow diagram of apparatus designed for the purpose of separating fat from a material.
Figure 5:
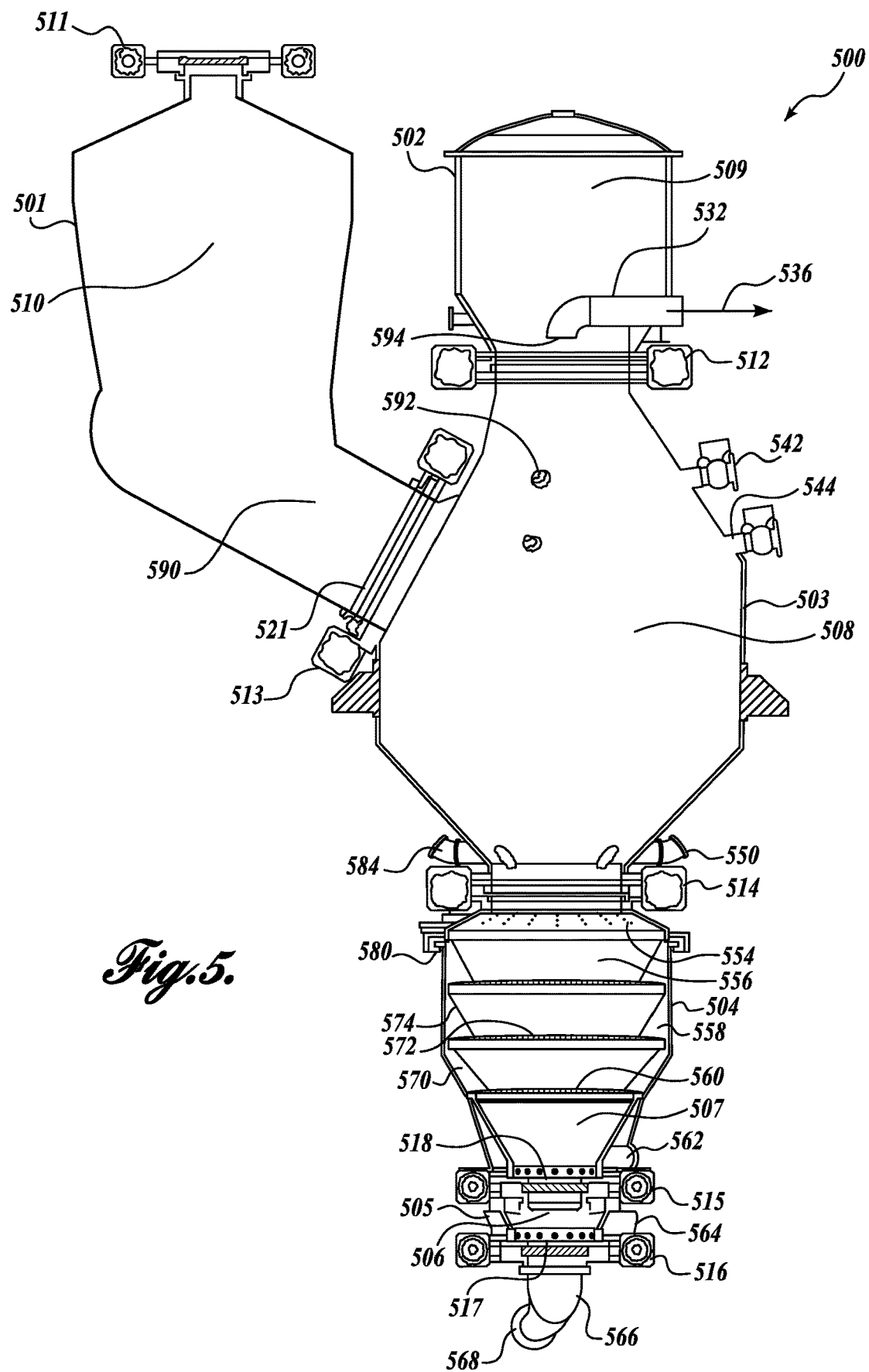
FIG. 5 is a schematic illustration of an apparatus comprising several interconnecting pressure vessels which communicate via gate valves in a configuration designed to provide a process to remove bone fragments from beef to yield boneless beef which is then divided into two components of lean beef and beef fat or tallow.

Referring to FIGS. 1, 2, 3 and 4, each FIGURE provides the flow path of a stream of boneless beef (or other similar fat containing material) including receipt of raw material in FIG. 1, which connects to the apparatus represented by rectangular images of FIG. 2, which in turn connects with the diced IQF beef receiving section shown in FIG. 3, and, in turn, the apparatus of FIG. 3 delivers a stream of fat containing lean to the edible rendering apparatus shown diagrammatically in FIG. 4. The combined flow diagrams of FIGS. 1, 2, 3, and 4 illustrate one embodiment of a production facility arranged in separated area's including Area 1, Area 2, Area 3 and Area 4 to provide an efficient, clean and effective process for the separation of fat (Tallow) from a stream of beef particulates according to the respective densities of fat and reduced fat material is provided. FIG. 5, illustrates an embodiment of an apparatus 500 for the separation of bone fragments and fat from a material such as beef. In one embodiment, the separation of bone fragments and fat relies on the respective densities of bone (cartilaginous matter or bone), fat, lean beef, and fluid carbonic acid to cause separation.

Referring to FIG. 1, a series of arrows connect block representations of apparatus and indicate the direction of flow of a single stream of raw beef received at block 101 and transferred to either combo dumper 106 or combo dumper 114. Combo dumpers 106 and 114 dump raw beef onto an inclined conveyor 107 which delivers the beef to one of between one and three dicing machines shown as blocks 108, 116, and 117, and a cutting table 113 conveniently arranged to provide for the manual cutting and reduction in size of beef pieces that are too large to be processed by the dicing machines 108, 116, and 117. The dicing machines 108, 116, and 117 are arranged to slice and dice the raw beef stream and reduce particulate size to any selected size but most preferably to about 1 inch in cross section by 2 inches or less. The individual particulates of diced beef will contain an amount of fat and an amount of lean. The diced beef is then transferred via inclined conveyor 110 directly to one of either carbon dioxide cryogenic tunnel freezers 111 or 109 which are arranged to Independently Quick Freeze (IQF) the beef particulates. The input temperature of the beef particulates may be about 32° F. to 40° F., but most preferably will be about 32° F. The temperature up to this point may be controlled, in general, by adjusting the temperature of the room in which the beef is being diced. After passing through either of the cryogenic freezers, the temperature will most preferably have been reduced to below 24 degrees F.

It has been realized that the temperature of the individual particulates is not uniform throughout the individual particulates. Because of the different heat transfer rates of fat and lean as well as the different percentages of water within lean and fat, the temperature of the lean will be higher than the temperature of the fat, due to the insulating properties of fat. The freezing step results in the lean portion within the individual beef particulate in a nonfrozen condition that remains flexible, while the fat is cooler at the surface and is in a brittle and friable condition due to the lower temperature.

After freezing, the particulates are transferred either to Area 2 via inclined screw conveyor 113 or alternatively the frozen beef particulates can be packaged at station 114 and shipped via shipping area 115 to a customer or other processing area. Packaging materials are received at station 103 and stored in storage area 104 prior to transfer to packaging area 114 for use in the packaging of frozen beef particulates. Liquid carbon dioxide is received at station 102, stored in storage tank 105 in temperature controlled, pressurized vessel facilities and transferred to either $CO_2$ freezer 111 or 109, via a series of flow control valves, most preferably at least one Coriolis measuring instrument, pressure relief valves and valves located to enable control over the mass flow of the fluid $CO_2$.

Referring to FIG. 2, a series of rectangular representations of apparatus are shown on both sides of a border defining area 1 and area 1A. Area 1A is defined by broken line 209 and apparatus within the borders defined by broken line 209 which represents and defines area 1, separate from the remaining rectangular representations of apparatus, which can be seen arranged outside the area defined by the broken line borderline 209. The area within the broken lines is defined as area 1A and the area outside defined as area 1. The apparatus within area 1A is provided for the purpose of pathogen deactivation according to the following description. Receiving area 201 transfers a stream of "incoming" raw beef via combo dumper 202 to size reduction apparatus 203 comprising dicing equipment capable of reducing particulate size to a suitable dimension thereby enabling pump 207 to transfer a continuous substantially void free stream of pressurized beef within a conduit or pipe, which connects directly to autoclave 208 via Coriolis measuring instrument 220. Coriolis 220 can measure density, mass flow and temperature of the material transferred there through, and accordingly, for example, the proportion of water contained in the beef transferred there through can be determined and recorded for comparison with similarly measured processed beef after processing through the areas described in association with FIGS. 1, 2, 3, and 4. The moisture content of the beef product is maintained, and this can be achieved by measuring the water content prior to processing, during the process to check on any variation, and after processing to confirm the "natural" water content of the stream of beef is not exceeded; this can be achieved as will be described below. The data collected by Coriolis instrument 220 is recorded automatically on computer disc or memory as the product is transferred through Coriolis 220 and into a perforated basket, which can be automatically transferred into and after processing therein, through the autoclave 208 to unload the processed beef at the opposite end from the loading end of the autoclave 208. This shuttling action provides a semi-continuous process wherein approximately 2,000 lbs of beef is loaded into the shuttling basket and it is then immediately transferred into the autoclave 208. A measured quantity of the raw beef is accumulated in autoclave 208 or alternatively in a hopper located directly above the shuttling basket at the input end of the autoclave 208 and in such a way that the shuttling basket can be loaded rapidly by opening a set of "bomb" doors arranged in the base of the upper hopper, so as to provide a rapid loading of the basket. The autoclave 208 operates by processing batches of beef product and when an amount of, for example 2,000 lbs, has been accumulated in the shuttle basket, the autoclave is closed and all air removed by displacement with carbon dioxide fluid transferred under pressure from $CO_2$ gas vessel 212. After purging substantially all air from autoclave 208, all ports are closed except for the connection to vessel 212, which charges the autoclave to about 350 psia with $CO_2$ gas. Communication with vessel 212 is disconnected by closing a valve, which is immediately followed with opening of valve connection to vessel 204 containing liquid carbon dioxide to facilitate transfer of $CO_2$ fluid, which then fills autoclave 208 with 950 psia fluid $CO_2$. During the transfer of $CO_2$ into autoclave 208, the beef contents enclosed within the "shuttling basket" are agitated to ensure that all surfaces of every piece of beef are exposed to sufficient liquid carbon dioxide to elevate the temperature at the surface of the beef to a preferred temperature of at least 89° F. but not more than about 108° F. Communication with the liquid $CO_2$ source vessel 204 is then interrupted by disconnecting or closing of a valve immediately prior to the immediate opening of a valve allowing transfer of super critical vapor from storage vessel 209, while $CO_2$ is allowed to escape via conduit connection into $CO_2$ recycle vessel 211. In this way super critical $CO_2$ vapor is transferred to the autoclave at a pressure of approximately 1,500 psia and with the suitable agitation within autoclave 208, all beef particle surfaces are thereby exposed to the aggressive solvent properties of super critical $CO_2$. Such exposure of pathogens (e.g., *E. Coli.* 0157:H7, *salmonella, Listeria Monocytogenese* and others) to super-critical $CO_2$ is lethal and will cause death within a few minutes of exposure. After a period of time of up to 7 minutes or more or less, the flow of supercritical $CO_2$ from vessel 209 through autoclave 208 and into recycle \vessel 211 is shut off and autoclave 208 depressurized to atmospheric pressure prior to the pathogen deactivated beef being transferred directly from autoclave 208 to dicing machine prior to transfer to and through carbon dioxide IQF freezing tunnel 214. After freezing, the beef particulates are transferred to a hammer mill via metering screw 215 and hammer mill 216 shatters fat content of the beef particulates without significantly reducing the size of the lean particulates.

It has been determined that the fat component of a frozen, diced piece of beef (or other meats) can be separated from the lean component by crushing the frozen beef so as to fracture the fat (fatty adipose tissue).

The fat component behaves quite differently to the lean component, particularly when frozen to a temperature below about 25° F. to about 10° F. or lower, but not to such a low temperature that will cause the lean to become brittle. When reduced size beef particulates are frozen in this way, the fat can be shattered and will crumble providing a suitable means of separating the lean component from the fat component. Typically, this method of separation produces much smaller pieces of fat while the lean particulates size remains largely unaffected. It is therefore possible to separate lean from fat by freezing, shattering the fat component, and then transferring the resultant stream of material through a vibratory sieve, which will allow the small fat particulates to pass through a sieve while transferring the larger lean pieces to another hopper; however, the sieve is not as effective as using the method of flotation in the anti-microbial carbonic acid. The hammer mill 216 (FIG. 2) is used to shatter the fat while the lean component remains essentially intact.

The stream of beef particulates, including the shattered small pieces of fat, is then transferred to area 2 or alternatively packaged at station 222 prior to shipping at 223.

Referring to FIG. 3, receiving station 316 is arranged to transfer the beef particulate stream from Area 1 (of FIG. 2) into the Large Particle Separator 317. Large particles can be separated and size reduced as required via the Large Particle Size Reducer 320. In one embodiment, the Large Particle Size Reducer 320 applies pressure to the large particles of beef by way of a horizontally disposed assembly of 4 parallel stainless steel bars mounted to a drive means at one end via a stainless steel disc end plate and to a bearing at the opposite end also via a stainless steel disc; the horizontally disposed assembly of 4 bars can rotate in the lower section of a horizontal trough having a lower profile that follows the underside profile of the 4 rotating bars. The trough material is stainless steel and is perforated with holes of a selected size such that when the rotating assembly of 4 bars is positioned so as to have little clearance between it and the lower section of the perforated trough any particles of greater size than the perforations will be size reduced by crushing until the reduction in size allows the particulates to fall through the perforations. The size reduced particles are then returned to the large particle separator 317 and added to the continuous stream of beef particulates and then transferred to second particle size reduction hammer mill 318 (or crusher) and from there via screw conveyor or vacuum transfer conduit 319 to single charge storage hopper 324 wherein sufficient processed frozen beef product is accumulated prior to transfer to buoyancy separation vessel 330.

As described above, the hammer mill 318 is used to crush the individualized particles of fat-containing particles of beef. The temperature of the individual particles is controlled such that the lean portion of the particle will remain flexible and not be prone to breakage or shattering, while the fat portion is friable and prone to breakage and will fracture and shatter into small particles. In one embodiment, the hammer mill 318 includes intermeshing teeth, either on opposed rollers or on top and bottom threads running parallel in a continuous manner. The spacing of the teeth can be determined based on the size of the fat particles that are shattered coming from the outlet of the hammer mill. If the fat particles are too large, the spacing between the teeth can be decreased to reduce the size of fat particles. If the fat particles are too small and/or lean is combined with the fat, then the spacing of the intermeshing teeth can be increased. From the hammer mill 318, the fractured fat particles and lean particles are forwarded to a separation vessel. Approximately 1,000 lbs, for example, can be accumulated in storage hopper 324 and at the appropriate cycle time transferred to buoyancy separation vessel 330, wherein the beef and fat particulates are blended with a quantity of carbonic acid sufficient to fill the buoyancy separation vessel which is sealed and pressurized to approximately 150 psia prior to the carbonic acid fluid transfer therein.

One embodiment of the separation vessel is illustrated in FIG. 5. FIG. 5 shows an apparatus 500, designed for the separation of bone fragments, lean beef and fat particulates from the hammer mill 318.

The separation of bone fragments and fat relies not only on the respective densities of bone (cartilaginous matter or bone), fat, lean beef, and fluid carbonic acid to cause separation when all are maintained at a similar temperature, above the freezing point of water, but also when the water containing matter of lean beef and bone fragments are at a temperature below the freezing point of water contained as a component of the matter such as lean beef and fatty adipose tissue (Fat).

Table 1 (below) lists the densities of; firstly, several beef components including bone, lean beef, fat and cartilaginous bone, at both above and below the respective frozen condition; and also carbonic acid and water. It can be seen that the densities of the frozen, water-containing beef components of lean and fat have lower densities compared to their respective unfrozen condition. This physical variation is because water expands when it freezes. The temperature at which beef freezes is at about 29° F. or below. Beef fat will float in water or carbonic acid whether it is in frozen condition or not but, as can be seen in Table 1, frozen lean beef having a density of about 59 lbs per cubic foot will float in water and/or carbonic acid which have densities of about the same value, about 63 lbs per cubic foot; however, when the lean beef is not frozen, its density increases to about 65 lbs per cubic foot and therefore will sink from a suspended position in water or carbonic acid. Neither bone nor cartilaginous bone contain significant quantities of water and their respective densities are not significantly affected by freezing; both are more dense than fat or lean beef. The separation methods described herein employ the density variations described above to provide an effective method of dividing a quantity of beef into fractions comprising the separated components only of bone, lean beef and beef fat.

TABLE 1

| Physical Matter | Density @ 4° C. | % Water Content | Density when frozen |
|---|---|---|---|
| Bone | 118.6 lbs/cu' | 0% | 118.6 lbs/cu' |
| Cartilage | 80 lbs/cu' | 0% | 80 lbs/cu' |
| Lean Beef | 64 lbs/cu' | 59% | 59.6 lbs/cu' |
| Lean Beef | 64 lbs/cu' | 73% | 58.6 lbs/cu' |
| Carbonic Acid | 63 lbs/cu' | 70% | 58 lbs/cu' |
| Water | 62 lbs/cu' | 100% | 57 lbs/cu' |
| Ice | 57 lbs/cu' | 100% | 57 lbs/cu' |
| Beef Fat | 55 lbs/cu' | 11% | 54.5 lbs/cu' |

APPROXIMATE DENSITIES & WATER CONTENT OF SPECIFIED MATTER

Low pH carbonic acid can be manufactured by combining a quantity of $CO_2$ vapor/gas with clean pure filtered water at a ratio of weight equal to about 1 part $CO_2$ to two parts water at a pressure of up to about 150 psia which will provide carbonic acid having a pH of about 2.6 units.

The arrangement of the vessel 500 illustrated in FIG. 5 comprises an arrangement of 5 pressure vessels, 501, 502, 503, 504, and 505 that are connected together to provide an assembly of pressure vessels and configured to allow communication between the vessels but also having valves 511, 512, 513, 514, 515, and 516 provided at the juncture of each pair of vessels so as to facilitate communication between the vessels or the isolation of each vessel as desired. The arrangement comprises a "separation apparatus" that can be used to separate lean beef from beef fat.

Spaces 510 and 590 have a combined volume sufficient to accommodate a full charge of beef (meat) particulates, wherein the charge has a volume and/or mass equal to the maximum quantity of beef particulates that can be processed in a "separation apparatus" 500 cycle.

The space 508 is equal to approximately 4 times the combined space of 510 and 590, and the space 509 is approximately equal to the maximum quantity of beef fat that can be processed by the "separation apparatus" 500.

The arrangement of vessels—"separation apparatus" 500 as shown in Section A-A FIG. 5 is constructed with vessel 502 at the upper end of a vertically disposed arrangement with vessel 503 centrally located and vessels 504 and 505 at the lower end and loading vessel 501 mounted above and to the side of the main separation vessel 503. The sequence of operation is as follows:

With valves 511 open and valve 513 closed, a charge of crushed, frozen to below 29.5 F and most preferably below 27 F and as low as 15 F, beef, fat, and, optionally, bone particulates are transferred into space 510, after which valve 511 is closed. $CO_2$ gas is provided into voids remaining in space 510 up to a pressure of about 150 psia. With valves 512, 513, and 514 closed, space 508 is pressurized to about the same pressure as space 510 with $CO_2$ and valve 513 is opened such that aperture at 521 is fully open thereby allowing the contents of space 510 to transfer by gravity feed into the lower region of space 508, after which valve 513 is fully closed.

Space 510 can be now reloaded in readiness for the next loading cycle of space 508.

Carbonic acid, water, filtered water, distilled water, potable water, water having been transferred through reverse osmotic treatment to produce potable water, or any suitable antimicrobial organic acid or alkali having a density of about 62-63 lbs per square foot at a temperature of about 40 F to 60 F is transferred into space 509, the remaining space in 508 and spaces 556 and 506 under pressure at about 150 psia. The antimicrobial fluid is recycled through ports 550,

584, 542, 544, and 592 at such a rate of flow so as to create turbulence and agitation of beef particulates which are now suspended in the antimicrobial fluid that fills the entire inner spaces of vessels 502, 503, 504, and 505. The valves 512, 514, and 515 are opened while the beef particulates remain substantially frozen and the agitation is stopped so as to allow bone fragments to settle by sedimentation into the lowermost space 505. Before the temperature of the beef particulates within vessels 502, 503, 504, and 505 equilibrates with the antimicrobial fluid in which it is suspended to an equilibrated temperature of above 32 F to above 34 F, the valve 515 is closed to isolate all bone particulates or chips in space 506. When the temperature of lean and fat components of the beef particulates transferred into space 508 is below the freezing temperature of the water contained within the particulates, both fat and lean particulates will remain suspended in the fluid because the density of the particulates is less than the density of the antimicrobial fluid, however, when the temperature of the fluid and particulates equilibrates, the lean component will sink into space 504 and below valve 514 at which time valve 514 is closed so as to isolate spaces 508 and 504.

Fat particulates float upward into space 509 after which valve 512 is closed so as to isolate space 509.

The quantity of fat particulates at about 34 F or more, which are now enclosed within space 509, is extracted, most preferably by vacuum, via port 594 and through conduit 532 in the direction shown by arrow 536.

Bone chips and unwanted cartilaginous bone is removed via port 564 and/or via aperture 517 after valve 516 is opened.

Lean beef (meat) is extracted via port 518 in valve 515 and through port 517 in valve 516, and then through conduit 566 and port 568, and transferred for further processing into edible food.

Fluids can be extracted through spaces 558, 570, after passing through holes 554, 572, 560, and also via ports 562 and 564, for water and $CO_2$ recovery for subsequent recycling prior to removal of solids as described above. Vessel 504 can include an outer cylindrical shell that tapers to a smaller diameter at the bottom. Within the vessel 504 are provided a series of frustoconically shaped vessels numbered 580, 574, and 507 from top to bottom, wherein the bases are oriented towards the upper portion of vessel. The side with the smaller diameter of the frustoconically shaped vessel fits within the side of the larger diameter of an adjacent vessel. This difference in diameter allows the placement of screens with holes 554, 572, and 560 above. Furthermore, the frustoconical shape creates spaces between the frustoconically shaped vessels and the interior of the outer shell of vessel 504.

Figure 6:
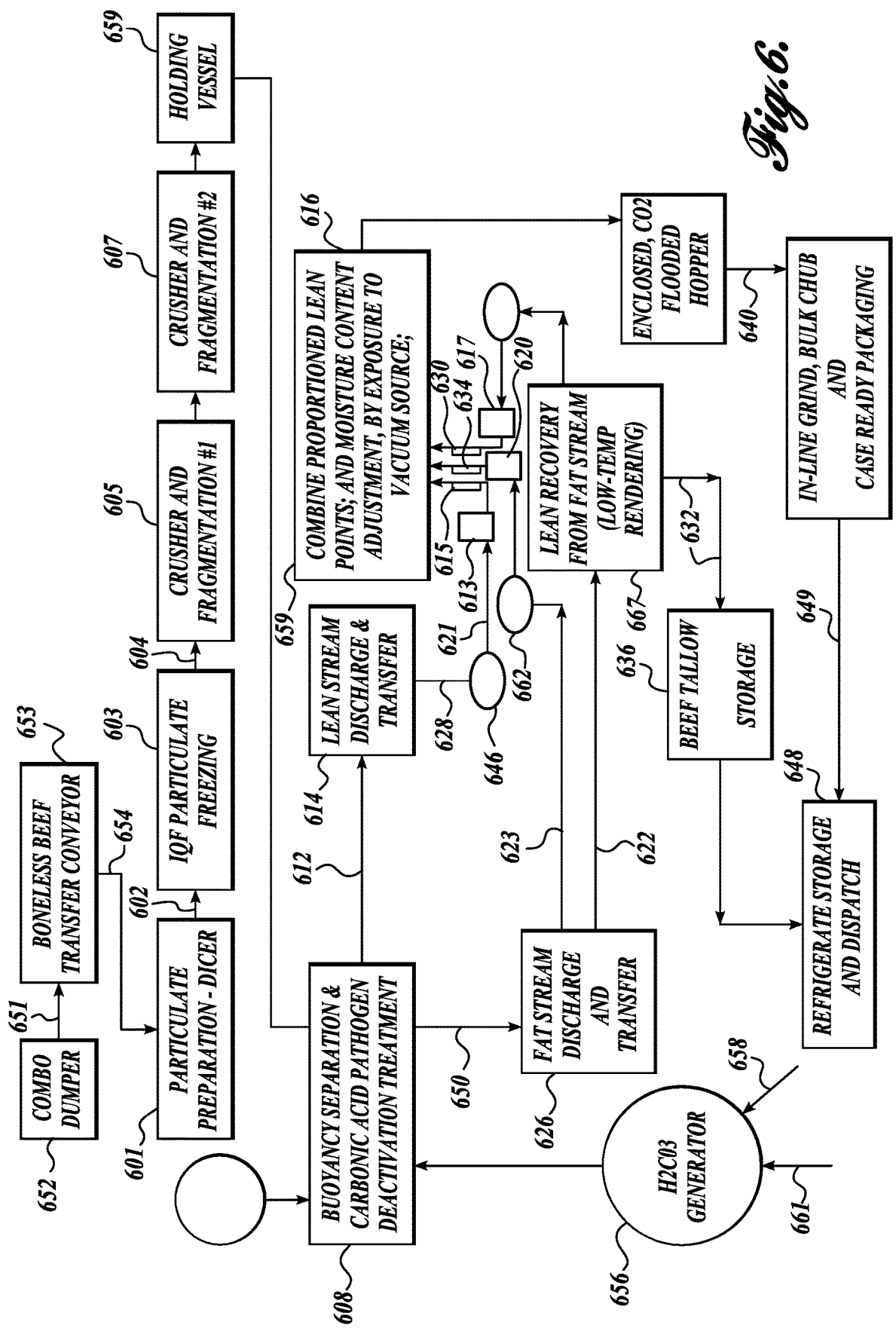
FIG. 6 is a flow diagram of apparatus designed for the purpose of separating fat from a material.

Referring now to FIG. 6, a flow diagram shows a combo dumper 652 arranged to transfer boneless beef (of any lean content, such as either 65, 50, or 73) via a connection represented by arrow 651 to a boneless beef transfer conveyor 653;

Conveyor 653 feeds particulate preparation, dicing apparatus 601, via connection 654 in the direction shown by arrows.

A stream of diced beef is transferred from dicing equipment 601 to a cryogenic IQF (Independently Quick Frozen) $CO_2$ conveyor freezer 603 via connection 602. The diced particulates are size reduced to not more than about 1" wide and 2" long strips or 2" cubes.

The frozen, diced beef and/or strips of beef (otherwise called beef particulates) is then transferred via connection 604 to a primary crusher 605, which is arranged to fragment the diced beef into smaller particles of fat that under such treatment will "crumble" while the process is generally unaffecting the lean component.

Most preferably the beef particulates are quickly frozen by cryogenic or a combination of cryogenic and mechanical freezing processes or mechanically alone, however flooding the mechanical freezer enclosure with 100% $CO_2$ gas displacing what would otherwise be air is a preferred process. In this way $CO_2$ gas can be recycled through the mechanical freezer evaporators. Another purpose in the use of $CO_2$ is to displace air (and therefore atmospheric oxygen), thereby inhibiting the formation of oxymyoglobin from the deoxymyoglobin exposed at the cut lean surfaces of each dice or beef strip (beef pieces) when diced or sliced.

The frozen temperature of the quickly frozen beef pieces when exiting the freezing tunnel or conveyor is most preferably controlled such that the lean component comprising substantially muscle striations is frozen with all naturally lean contained fluids, wherein water represents about 70% of the lean component, are in solid phase but in such a way that the physical characteristics and properties of the lean muscle striations are pliable and "rubbery" in texture, while the fat component is friable such that it fractures when subjected to compressive and twisting actions and will crumble readily into small particles. The temperature to which the beef pieces are reduced needs to alter the physical condition of the beef pieces so as to facilitate the flexing of the muscle striations of the lean without causing it to fracture and break into smaller pieces, while simultaneously rendering the fat component friable such that it will fracture, crumble, and break into smaller separate particulates. In this way, the friable fat having broken away from the lean when it is flexed, crushed, bent, and twisted, thereby reduces the fat component into small separated particulates while what becomes the relatively larger lean particulates (because they are generally not broken into small particulates). The change in physical condition of the beef pieces caused by lowering the temperature thereof followed by physical disruption of the bond, which fixes the fat and lean components together in an attached state, results in a size difference between the larger lean particulates compared to smaller fat particulates. It has been found that by reducing the temperature of the beef pieces with fat to a range of between less than 29° F. and above 26° F., the process described above will facilitate separation by providing friable fat fractures permitting the fat to crumble into small particles, leaving the lean as larger particles.

In the embodiment of FIG. 6, a second crusher 607 completes a process that reduces the treated tallow (fat) to crumbs that separate from the lean beef, which is again generally unaffected by the crushing process. A vacuum source draws the stream of crushed beef particulates into holding vessel 659. Carbon dioxide gas is fed into the second crusher 607 to displace air and provide the gas by which the vacuum source enables transfer through an enclosed conduit to hopper 659. Frozen beef particulates are accumulated in hopper 659 until a sufficient amount has been collected to provide for the next separation cycle in the "buoyancy separation and carbonic acid pathogen deactivation treatment, pressure vessel 608.

Pressure vessel 608 can be the vessel described in association with FIG. 5. A quantity of between 750 lbs to 1,000 lbs beef particulates is transferred into separator pressure vessel 608 and isolated therein by closing valves on open filling ports. Vessel 608 is then pressurized to about 75 psia and pressurized carbonic acid transferred from acid generator vessel 56 until pressure vessel 608 is full. Pressure is maintained, at about up to about 125 psia to 150 psia, such that the pH value of the carbonic acid is low and in the order of between 3.4 and 2.6 pH.

The carbonic acid generator 656 is provided with a filtered water supply 658 and carbon dioxide vapor 661 in the proportions of about 66% water to about 34% carbon dioxide by weight at the set pressure of up to 125 psia to 150 psia. Agitation is provided by aggressive fluid turbulence, created within vessel 608 by extracting carbonic acid from the vessel and pumping a corresponding return flow, under pressure, through a series of ported valves. After adequate agitation, the pumps are turned off and the vessel with contents settles such that the tallow contents at about 55 lbs per cu. ft floats and the lean component of the suspended beef sinks in the carbonic acid fluid and separation occurs within about 1 minute. The proportions are usually about 66% lean component and 34% fat or tallow.

A valve restricting flow via connection 612 is opened to allow the lean component to be transferred by vacuum via conduit 612 into vessel 614. The separated lean component is then transferred into vessel 646 via conduit 628, by vacuum.

The separated fat component is transferred, under vacuum, via 650 into transfer vessel 626 and divided into two streams 623 and 622. The major proportion of the fat stream is transferred under vacuum to "Lean Recovery from Fat Stream" vessel 667 with a lesser proportion available to keep vessel 662 filled so as to allow positive displacement pump 620 to transfer a controlled stream of fat beef through Coriolis density and temperature measuring instrument 634.

A total of three streams of beef are transferred via positive displacement pumps 613, 620, and 617, through Coriolis instruments 615, 634, and 630, respectively. The mass flow of each stream is adjusted according to the fat content of the (coriolis) measured stream by controlling each of the respective positive displacement pumps.

A stream of high lean content beef extracted from the fat stream transferred into vessel 662 supplies positive displacement pump 617 according to demand.

In this way, three streams of beef comprising a first high lean beef stream separated in buoyancy vessel 608; a second high lean stream extracted in a low temperature rendering process by equipment 667; and a third fat stream derived from the separated fat component in separation vessel 608. Each beef stream is transferred at a controlled mass flow determined by the fat content of the measured stream as analyzed by each of the Coriolis instruments 615, 634, and 630.

The three beef streams transferred via coriolis instruments 615, 634, and 630 are blended inline to provide a stream of beef having a selected fat content, which may be, for example, 15%, for the production of 85% lean beef.

Vessel 616 is mounted on load cells and moisture is extracted under very low vacuum (below 4.7 torr) to ensure the moisture content of the finished stream of beef corresponds with the input stream prior to separation.

After moisture content correction is complete the stream of boneless beef is transferred into enclosed $CO_2$ flooded hopper 38, which feeds directly into a stuffer and inline grinder, such as one known under the name Handtmann.

The finished product is transferred via connection 640 and chub packaged, alternatively converted into beef patties or as may otherwise be required.

After packaging the finished product is transferred via 649 to area 648 where it is stored prior to dispatch.

The surplus stream of beef tallow extracted in the lean recovery equipment is transferred via connection 632 to beef tallow storage 636 prior to dispatch.

The ratio of frozen beef (meat) particulates (fp) to fluid (f) [i.e. fp:f] should be between 1:1 and 1:10 but most preferably at about 1:5;

Temperature of the frozen particulates should be not more than 29° F. and preferably not less than 0° F. but most preferably about 15° F. to about 24° F.;

Temperature of the fluid (suspension or buoyancy medium) should be not less than about 40° F. and not greater than about 60° F., but most preferably at about 50° F., before being mixed with the beef particulates;

When the beef particulates and fluid are mixed together, whether enclosed within separation conduits (tubes), an enclosed vessel, a centrifuge or hydro-cyclone, the equilibrated temperature of the fluid should not be less than about 31° F. to about 40° F. but most preferably at about 32° F. to 34° F.;

When the fluid is first mixed with the frozen lean beef and beef fat particulates, all of the particulates will float, suspended at the uppermost space available in the fluid and just below a surface of the fluid or suspended within the fluid; as the temperature of the fluid and particulates equilibrates, which involves the initial lower temperature of the beef particulates increasing, corresponding with the decreasing temperature of the fluid, the buoyancy of the lean particulates will start to "fail" until the lean particulates sink to the base of the fluid leaving the beef fat particulates floating at the fluid surface or uppermost available space in the fluid.

Bone chips that may be present with the beef particulates will sink when all mixed together with the fluid, thereby providing a very convenient means of separating bone chips, which will most preferably be arranged to occur immediately after blending the beef particulates with the fluid and before temperature equilibration of the particulates or more importantly when the lean beef temperature has increased so as to thaw the lean/water content of the lean beef upon which shrinkage of the lean beef will occur causing it to sink in the fluid. The fat particulates, frozen or not, will remain floating at the fluid surface. By lowering the fluid temperature relative to the temperature of the beef particulates, complete thawing and temperature equilibration will be delayed and, accordingly, the lean particulates will remain suspended for a longer period and this can assist with UVc pathogen deactivation as described below;

The frozen beef particulates suspended in the anti-microbial fluid (at a suitable ratio of fluid particulates in the range of 1:5 to 1:10) can be treated by exposure to UVc light, which is lethal to pathogens when the exposure is sufficient. The suspension of frozen beef particulates in sufficient anti-microbial fluid (or water) can be transferred at a steady rate of transfer through an enclosed/sealed internally polished (preferably stainless steel) tube within which an elongated, tubular profiled, UVc light source is mounted, in parallel with the enclosing SS tube. As the temperature of the suspension steadily equilibrates the outer surface of the beef particles thaw, if pathogens are present, the single celled organisms will be at the surface of the beef particulates or suspended in the fluid but, in any event, at locations readily accessible to the direct "line of sight", UVc light source given that the particulates revolve while suspended. UVc is lethal to such pathogens as *E. Coli* 0157:H7 and Salmonellas and such pathogen contamination can be deactivated by adequate exposure to UVc. The particulates suspended in the fluid revolve randomly as the suspension is transferred through the UVc apparatus. Pathogens are quickly deactivated when exposed to the UVc light source.

In one embodiment, the process of separating fat from lean is achieved most preferably within enclosed conduits and after separation of predominantly lean particulates from predominantly fat particulates in two parallel streams including a first high percentage lean content stream (comprising for example 93%+/−<1.0% lean with the balance being fat) and a second initial fat stream of high fat content (comprising about 85% fat with the balance being lean). The two streams are transferred in the same direction, within first and second enclosed conduits, in such a way that the separated lean and fat travel along the respective first and second conduits at approximately the same velocity (up to about 10 feet per second) to each other. The separated second stream of fat, although separate from the first stream of lean, is in relative close proximity to the lean from which it was separated. In this way the fat stream can be divided, yet again, into third and fourth stream divisions wherein at least one of the fat stream divisions can be a measured third stream division of the initial second stream of fat. The mass of the measured third stream division can be adjusted by varying the quantity transferred in the third stream, and continuously measured and/or weighed on a continuous weighing, variable speed conveyor belt. The measured third stream can then be recombined with the entire first stream of lean such that the relative proportions of fat and lean after recombining provide a single recombined stream with fat and lean content proportions according to a selected ratio. In other words, for example, by accurately measuring the fat stream division the resultant lean content of the recombined stream can be any value less than the lean content (93%+/−<1.0% lean) of the first lean stream. A recombined stream lean content of 81%, 85%, 90% or any other value can be produced in this way.

In another embodiment, fresh boneless beef at <38° F. is diced (sliced and cross-cut) to provide a first stream of beef particulates of about 0.75" wide×0.5" deep×1.5" long. The stream of beef particulates are then partially frozen in a continuous tunnel freezer that may be a cryogenic freezer using nitrogen or carbon dioxide as the refrigerant, such that upon transfer out of the freezing tunnel (or other style of freezer) the temperature of the fat (at its surface) is lower than the temperature of the lean components in each particulate or separate piece of beef. The temperature at the surface of fat may be at about 5° F. or less and up to 10° F. or more such that it can be friable and crumble upon application of pressure, while the temperature of the lean may be 16° F. to about 34° F., which makes the lean flexible and not frozen into a "rock-hard" condition immediately after removal from the freezing process.

The above description of creating friable fat prone to crumble is attributed to the respective differences in the heat transfer ability of fat compared to lean. Table 2 (and FIG. 7) shows representative temperatures of fat and lean exiting a tunnel freezer. As can be appreciated, immediately after leaving the tunnel freezer, the fat is at a temperature of 5.2 F. (at the surface), while the lean is at a temperature of 29 F. This difference in temperature is attributed to the respective heat conductive properties of fat versus lean. The individual pieces of meat containing both fat and lean are exposed to the freezer on the order of minutes, generally, between 2 and 3 minutes to create a friable fat component prone to crumble under a crushing force, whereas the lean remains pliable, flexible and not prone to crumble under a similar crushing force. The temperatures will then begin to converge to equilibrium; therefore, it is useful to apply pressure before the fat is no longer friable and easy to crumble.

TABLE 2

Temperature Difference of Fat and Lean

| | | | | | Temperature | |
| | Date | Time | delta T' | delta T | Fat | Lean |
|---|---|---|---|---|---|---|
| 1 | Aug. 3, 2010 | 3:31:00 PM | 0:00 | 0:00 | 5.2 | 29.0 |
| 2 | | 3:37:00 PM | 0:06 | 0:06 | 27.9 | 26.6 |
| 3 | | 3:43:00 PM | 0:06 | 0:12 | 29.5 | 26.9 |
| 4 | | 3:50:00 PM | 0:07 | 0:19 | 30.9 | 27.8 |
| 5 | | 3:58:00 PM | 0:08 | 0:27 | 29.7 | 28.6 |
| 6 | | 4:03:00 PM | 0:05 | 0:32 | 30.6 | 28.9 |
| 7 | | 4:14:00 PM | 0:11 | 0:43 | 31.0 | 29.5 |
| 8 | | 4:22:00 PM | 0:08 | 0:51 | 32.8 | 29.8 |
| 9 | | 4:31:00 PM | 0:09 | 1:00 | 33.3 | 30.0 |
| 10 | | 4:36:00 PM | 0:05 | 1:05 | 35.3 | 30.0 |

The stream of partially frozen beef particulates can then be immediately, without storing in containers or otherwise that could allow temperature equilibration of the fat and the lean components, or on an extended conveyor, transferred through a crushing process during which the beef particulates are "flexed" or bent by distortion and partially crushed as they are transferred between a pair (two) of parallel rollers manufactured, most preferably, from any suitable stainless steel such SS316 or SS304 grades, but wherein the beef particulates are not completely flattened as would occur if placed on a hard surface and rolled upon with a very heavy roller (steam/road roller for example). This crushing process is most preferably intended to cause breakage of the friable fat components into smaller pieces of, in the majority of instances, 100% fatty adipose tissue (fat) and smaller than the fat components were before transfer through the crushing process and much more so than the lean components which remain in most cases intact but without any more than about 10% fat, or preferably less, remaining attached to the majority of lean components after transfer through the crushing process. In other words, the fat components of the beef particulates will "crumble", fracture, break into small pieces and separate from the lean components in a continuous stream of what becomes small (smaller than before transfer through the crushing process) fat particles and pieces of lean beef comprising, most preferably, more than 90% lean beef.

The stream of still partially frozen beef particles (mostly/only fat and mostly/only lean particles) is combined with a pressurized stream of liquid carbonic acid ($H_2CO_3$) at about 70 psia (but the pressure could be up to about 50 Bar) within a conduit. The fat components are separated and extracted from the stream and processed through a particle size reducing apparatus such as a bowl chopper or even an emulsifier used to break the cell walls but at this stage in the separation process most preferably the fat particles in the fat stream will be size reduced, but not to the extent of breaking cell walls, but only so as to ensure all red and white colored "lean" components are separated from a fat component.

Additionally, the lean stream is separated from a major proportion of the carbonic acid and then combined with the fat stream after the fat stream has been processed via a size reduction apparatus such as a bowl hopper.

The combined lean and fat streams including a reduced quantity of carbonic acid (or carbon dioxide and water), altogether in a single stream is then transferred into a decanter style centrifuge. The decanter style centrifuge separates the lean, liquid water and carbonic acid, and fat in typical fashion into layers according to density with the heaviest (lean) forming a layer around the inner surface of the centrifuge barrel. The water, carbon dioxide and fat together are separated from the lean in two entirely separate streams.

Figure 8:
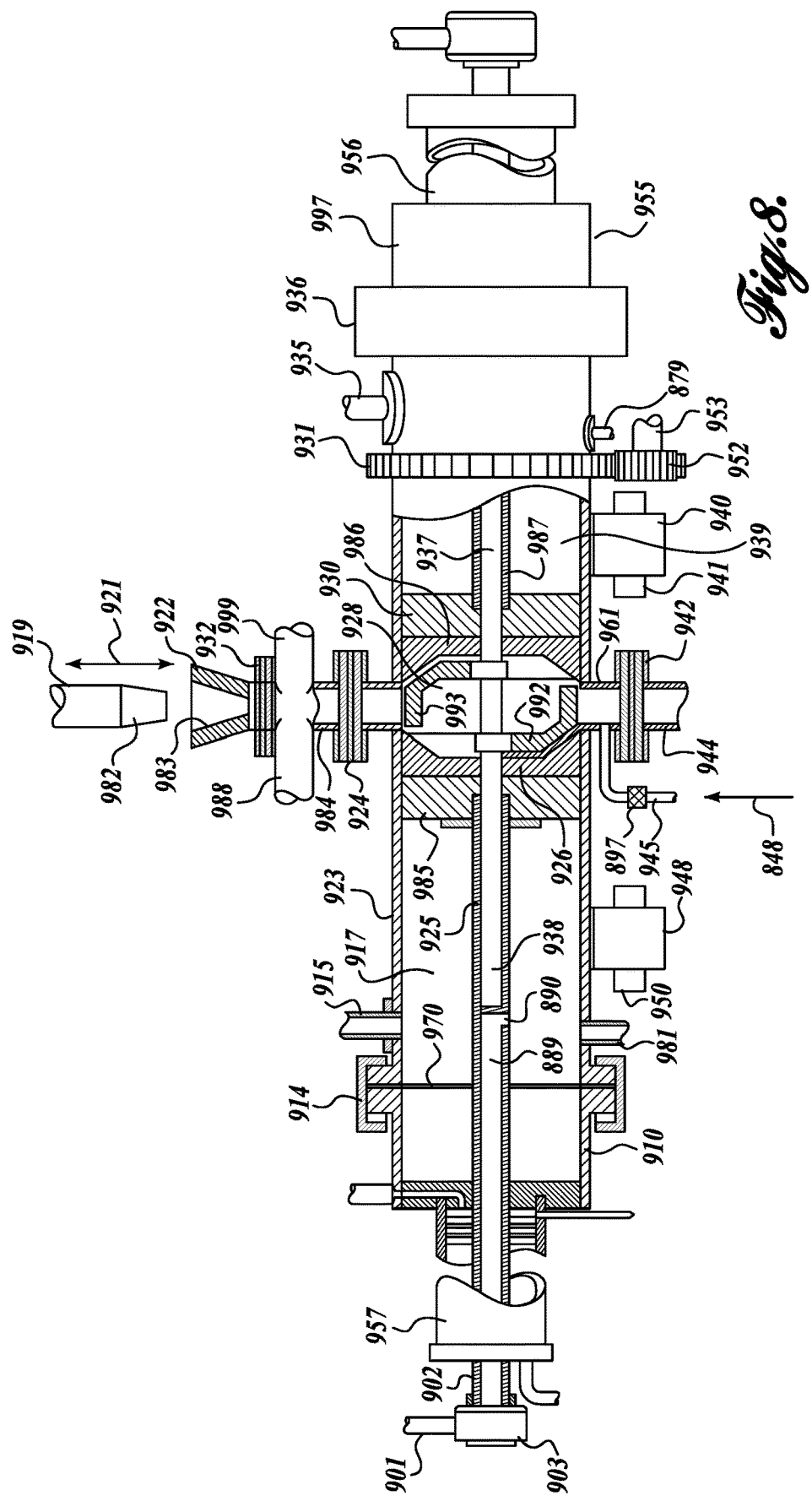
FIG. 8 is a schematic illustration of a pathogen deactivation vessel.

Referring to FIG. 8, a Pathogen Deactivation Vessel (PDV) 955 is shown in partial cross section. A horizontally disposed vessel 923 is arranged with end caps 910 and 997 which are held in place by "rings" 914 and 936, thereby providing an adequate sealing at interfaces such as 970. The annular members 914 and 936 can be rotated to release end caps 910 and 997 or alternatively rotate in the opposite direction to tighten the end caps at interface such as 970.

A pair of horizontally opposing pistons 926 and 986 are arranged with backing plates 985 and 930 attached, via piston rods 925 and 987, to hydraulic cylinders 956 and 987. Each piston assembly is fixed at its circumferential center to a piston rod 925 or 987. FIG. 8 shows the piston rods with pistons 986 and 920, fully extended, inwardly, toward the center of the PDV 955 so as to provide 3 separated spaces, 928, between the pistons, and 939 and 917.

An upper, centrally disposed port is attached to a manifold 984 with gate valve 924, which can seal the port closed as needed. Gate valve 932 separates the vessel loading apparatus from manifold 984. Conduits 999 and 988 connect via suitable "open/closed" valves directly with ports 935 and 915 respectively (connecting pipes not shown), such that when gate valve 932 is closed and gate valve 924 is open, a direct communication between the centrally located space 928 with spaces 939 and 917 is provided.

A lower, centrally located port 961 is connected to extraction conduit 944 via gate valve 942. A drainage pipe 945 with valve 897 is also provided.

Ports 981 and 879 are also connected to space 928 via pipe 945 or manifold 984. Valves (not shown) are provided at ports 981 and 879 to isolate the ports as needed.

A shaft 937 extends through the center of piston rods 987 and 925, pistons 986 and 926 and backing supports 930 and 985 to an end 938. Impellors 992 and 993 are diametrically opposite each other and both are attached to impellor shaft 937 and are also profiled to fit close to the recessed surfaces of the pistons 926 and 986, respectively, as they are rotated by impellor shaft 937, which is attached to a driving mechanism (not shown).

A spur gear (wheel) 931 is fixed to the outer circumference of the PDV and is arranged to engage with pinion 952 which is mounted to drive shaft 953.

A "cradle" of rollers such as 940 and 948, mounted to shafts such as 941 and 950, are arranged to retain the entire weight of the PDV 955 and hold the vessel captive while allowing it to be rotated in both clockwise and counter clockwise directions by the pinion 952, which is driven via shaft 953 so as to rotate the vessel assembly 955 190 degrees from the perpendicular in a counterclockwise direction, and then 380 degrees in a clockwise direction, and then in a counterclockwise direction, repeating the back and forth rotation during each cycle of the apparatus described in association with FIG. 8.

A rotary union 903 communicates directly between supply pipe 901 carrying carbon dioxide liquid or vapor and piston rod 902 passageway 889 and exit port 890.

Female member 922 with inner conical profile 983 is arranged to connect with male member 919 with conical profile 982 such that when member 919 is extended in the direction shown by arrow 921 the outer surface 982 and inner surface 983 of member 922 contact and provide a seal in a way that allows boneless beef to be transferred directly from a vessel (not shown) holding a single "charge" (for example 2,000 lbs) predetermined quantity of boneless beef. Member 919 can be extended so as to sealingly mate with member 922 so that when gate valves 932 and 924 are open and valves closed (not shown), sealing contents of spaces 917 and 939 therein. In this way, boneless beef of a predetermined and measured quantity (in a vessel mounted on load cells above PDV 955) can be transferred from the vessel, via members 919 and 922 and through manifold 984 and into space 928. After transfer of a full load ("charge") of boneless beef into space 928, gate valve 932 can be closed, and any open space remaining within space 928 can be filled with pressurized $CO_2$ gas to a selected pressure such as 750 psi via conduit 945 and in the direction shown by arrow 848. Following pressurizing of space 928, valves can be opened to provide an open conduit between spaces 917, 928 and 939. Hydraulic cylinders 987 and 956 hold pistons 926 and 986 in position, as needed, and can be activated simultaneously to move away from each other, thereby increasing the volume of space 928 and decreasing the volume of spaces 939 and 917. This action causes $CO_2$ fluid to be displaced and transferred into space 928 from both spaces 939 and 917 via ports 915, 981, 879 and 935. Both pistons 926 and 986 can be withdrawn as seen fit but preferably to the fullest extent thereby transferring a major portion of the fluid $CO_2$ into the expanded space 928. Valves and the valves isolating ports 981 and 879 are then closed and pistons 986 and 926 activated in a direction toward each other so as to reduce the volume of space 928, increasing pressure to about 1,500 psia.

During the movement of pistons 926 and 986 toward and away from each other, impellors 993 and 992 are rotated and PDV 955 is also rotated.

In one embodiment, pistons 926 and 986 are sequentially activated to compress the contents of space 928 and hold a pressure of 1,500 psia, thereby maintaining a super critical $CO_2$ phase in space 928 for a predetermined period such as 85 seconds followed by a movement of pistons 926 and 986 away from each other, reducing the pressure in space 928 to a subcritical pressure of 900 psia for 85 seconds.

A treatment of boneless beef can be arranged such that each alternated 85 second period at 900 psi and 85 seconds at 1,500 psi can be sequentially repeated in a series of alternating sub critical and super critical $CO_2$ phase conditions and in such a way that any bacteria present on the boneless beef will be rendered none viable or killed.

At the conclusion of the treatment (cycle), the two pistons 926 and 986 move toward each other and in so doing, reduce the volume of space 928 to a minimum and expanding the volume in spaces 917 and 939, while still rotating the vessel (back and forth) until the boneless beef is compressed in the center so as to expel all $CO_2$ fluid which is extracted via the upper manifold and into the spaces 917 or 939. In this way, $CO_2$ loss is substantially reduced.

The following TABLE 3 provides a sequence of steps executed by the pathogen deactivation vessel 955

TABLE 3

| Sequ. # | Sequence/Action per single system cycle and then repeat in a continuous succession of cycles | Seconds |
|---|---|---|
| 1 | PDV Evacuation [50%] by retracting pistons - aided by external blower (if needed) | 16 |
| 2 | Load 2,000 lbs boneless beef = to <50% PDV volume [NB: must exclude any atmospheric oxygen] | 75 |
| 3 | Pressurize PDV with vapor/gas - to 900 psia | 15 |
| 4 | Close gas valves; open liquid valves | 10 |
| 5 | Fill with L-CO2 @ <900 psi PDV pressure (from reverse side of piston) by retracting piston (additional from remote source via piston rod) | 30 |
| 6 | Rotate PDV Thru' 190° from perpendicular in both directions [additional Agitation by activating pistons stroke - 2 ways × 24"] and rotating impellor [see sketch] | 85 |
| 7 | Increase PDV pressure to 1,500 psi and <120 F. | 5 |
| 8 | Continue rotation of PDV Thru' 190° from perpendicular in both directions [Agitation by activating pistons stroke - 2 ways × 24"] plus impellor | 85 |
| 9 | Decrease PDV pressure to 900 psi and <85 F. | 5 |
| 10 | Continue rotation of PDV Thru' 190° from perpendicular in both directions [Agitation by activating pistons stroke - 2 ways × 24"] plus impellor | 85 |
| 11 | Increase PDV pressure to 1,500 psi and <120 F. | 5 |
| 12 | Continue rotation of PDV Thru' 190° from perpendicular in both directions [Agitation by activating pistons stroke - 2 ways × 24"] plus impellor | 85 |
| 13 | Decrease PDV pressure to 900 psi and <85 F. | 5 |
| 14 | Continue rotation of PDV Thru' 190° from perpendicular in both directions [Agitation by activating pistons stroke - 2 ways × 24"] plus impellor | 85 |
| 15 | | |
| 16 | | |
| 17 | Compress beef between pistons to remove a pre-determined quantity of CO2 vapor from beef and transfer via an upper port (open valves to LP storage PDVs) DO NOT DAMAGE BEEF!! | 70 |
| 18 | Chill beef by sudden internal PDV pressure drop of a measured quantity of L-CO2 (by retracting pistons to lower pressure) and then open valve to external accumulation vessels - may be strapped to PDV) | 75 |
| 19 | Close//open valves as required | 15 |
| 20 | Reduce PDV Pressure to ambient (T = 32 F. to 36 F.] [could be combined with 21] | 45 |
| 21 | Unload beef from PDV (via lower 14" D port) | 75 |
| 22 | Open/close valves | 10 |
| 23 | Return pistons to 45% PDV volume between pistons [L-CO2 behind pistons] | 15 |
| CPH | 4.02                                    3600 | 896.00 |

TABLE 4 below shows the deactivation using the pathogen deactivation vessel for various pressures and times.

| | | Treatment - cpSC-$CO_2$ | | | |
|---|---|---|---|---|---|
| | | | Exposure Time | | |
| | | | Initial Hi Pressure Exposure | | After 4 Days Storage at Ambient Total |
| Rep # | Organism | Hi Pressure PSIG | Min | Initial Reduc. $Log_{10}$CFU/Gm. | Reduction - $Log_{10}$CFU/Gm. |
| 1 | Generic E. Coli | 2,400 | 3 | 1.2 | 4.0 |
| 2 | E. Coli 0157:H7 | 2,100 | 3 | 1.8 | 3.5 |
| 3 | Generic E. Coli | 1,800 | 7 | 1.1 | 3.0 |
| 4 | E. Coli 0157:H7 | 1,600 | 7 | 1.9 | 4.1 |
| 5 | E. Coli 0157:H7 | 1,500 | 1 | 1.6 | 3.8 |
| 6 | Generic E. Coli | 1,300 | 5 | 0.9 | 2.9 |
| 7 | E. Coli 0157:H7 | 1,100 | 5 | 0.8 | 2.9 |

TABLE 5 below shows the deactivation using the pathogen deactivation vessel for various pressures and times.

| Rep # | Organisms (Cocktail) | Hi Pressure PSIG | Exposure Minutes | Reduction $Log_{10}$CFU/Gm. |
|---|---|---|---|---|
| | Treatment - controlled phase Super Critical $CO_2$ | | | |
| 1 | Generic E. Coli | 1,100 | 3 | 5.8 |
| | E. Coli 0157:H7 | to | | 5.7 |
| | Listeria monocytogenes | 1,300 | | 4.0 |
| | Salmonella-spp. | | | 5.8 |
| 2 | Generic E. Coli | 1,600 | 3 | 5.8 |
| | E. Coli 0157:H7 | to | | 6.4 |
| | Listeria Monocytogenes | 1,800 | | 4.7 |
| | Salmonella-spp. | | | 6.0 |
| 3 | Generic E. Coli | 2,000 | 3 | 1.9 |
| | E. Coli 0157:H7 | to | | 4.4 |
| | Listeria Monocytogenes | 2,200 | | 5.2 |
| | Salmonella-spp. | | | 6.0 |
| | Treatment - Sub-Critical (Liquid) $CO_2$ | | | |
| 4 | E. Coli 0157:H7 | | 3 | 5.5 |
| | Listeria Monocytogenes | 700-800 | | 2.7 |
| | Salmonella-spp. | | | 5.4 |

The temperature of Liquid CO2 @ 900 psia is about 74° F.

The density of Liquid CO2 @ 900 psia is about 45 lbs/cubic Ft;

The temperature of Fluid CO2 @=to, or >1072.1 psia is about 87.8° F. (the Critical Temperature);

The density of Fluid CO2 @=to, or >1072.1 psia is about 28.96 lbs/cubic Ft; (the Critical Temperature);

The density just below the Critical Point, at say about 84° F. is about 41 lbs/cu'; so it can be seen there is a substantial reduction in density at just above The Critical Temperature, when compared to just below The Critical Point.

The density of the food (boneless beef), which comprises lean beef of about 66 lbs/cu' and tallow/beef-fat of about 55 lbs/cu' and, therefore, an equal quantity of each (50's) averages about 60 lbs/cu' to 61 lbs/cu'.

When boneless beef, at about 60.5 lbs/cu', is immersed in fluid supercritical CO2 at about 1,100 psia, the buoyancy effect of the supercritical CO2, at 28.96 lbs/cu' (say <30 lbs/cu') is minimal when compared to liquid CO2 at say 18° F. and 400 psia, which is about equal to the average density of 50's (i.e. 60.5 lbs/cu').

However, the temperature of liquid CO2 at 60.5 lbs/cu' and 400 psia is about 18° F. and beef will freeze at this temperature. It is therefore useful to provide suitable temperature conditions at the surface of the boneless beef as is pressure. A temperature of 18° F. will freeze boneless beef with any bacteria that may be present which could provide conditions in which at least some bacteria would be preserved. These conditions must be avoided and therefore a compromise is required.

It is useful that all pieces of any quantity of boneless beef being treated to remove or kill bacteria, or pathogens that may be present on the beef, are thoroughly soaked and "wetted" with CO2 and to such an extent that the entire surface of each piece including within and under any and all slits, cracks, cuts, flaps or folds, is sufficiently saturated. Most preferably, the treated surface will have absorbed CO2 during the sub-critical treatment.

When the boneless beef is immersed in higher density, fluid —CO2, such that the buoyancy effect of the CO2 is sufficient to cause separation or the improved capacity of the beef pieces to separate, each piece of boneless beef will be more readily exposed to the CO2 in which it is immersed. When the density of the CO2 is greater, thorough soaking of all boneless beef surfaces in the CO2 is more readily provided and CO2 is more readily in contact with the surfaces. Under these conditions, agitation of the combined boneless beef and fluid CO2 can enhance the exposure, hence the process provides for such agitation.

More particularly, in order for the entire surfaces of the boneless beef pieces to be thoroughly soaked in fluid CO2 when immersed in the fluid CO2, greater buoyancy will more readily and thoroughly facilitate the desired exposure of all surfaces to CO2 and, more particularly, enable the beef surfaces to absorb relatively greater proportions of CO2 (which occurs more readily at lower temperature). By alternating between a lower and higher pressure, CO2 is absorbed at the beef surfaces at the lower temperature, which then becomes a "source" of CO2, at the surfaces (which is where any bacteria will be present) and provide for the lethal conditions desired when a sudden pressure increase can provide the desired super-critical conditions at the surfaces of the boneless beef.

In consideration of the above, a method providing alternating conditions of exposure to super-critical CO2 conditions (which is lethal to bacteria) with sub-critical conditions, wherein pressure within the autoclave (PDV 955) is sequentially and rapidly increased and decreased between about 1,500 psia and about 900 psia, is disclosed.

Figure 9:
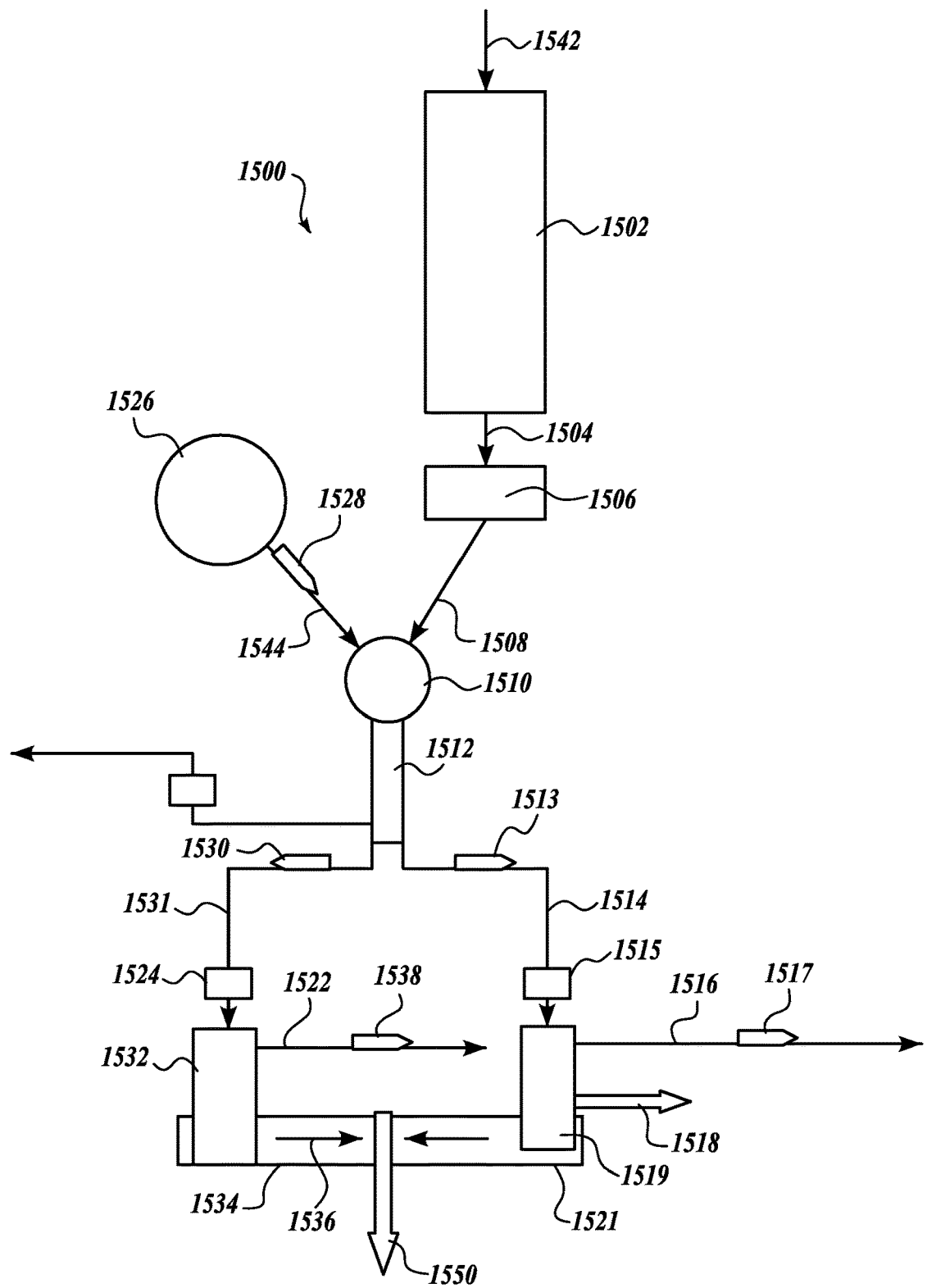
FIG. 9 is a flow diagram of an arrangement of apparatus for separating fat from a material and producing meat of selected fat content.

Referring now to FIG. 9, a block diagram with a series of arrows is intended to provide an understanding of a process 1500 arranged to enable the efficient production of any fat content ground beef or boneless beef.

Pathogen deactivated boneless beef is sliced into beef strips or diced and then transferred in the direction shown by arrow 1542, onto a conveyor in a continuous stream and then through an IQF cryogenic freezing tunnel 1502. The source materials from which the stream of diced beef or beef strips is processed comprises a combination of what is commonly known as 50's and 65's boneless beef, or any other suitable boneless beef.

The beef strips (diced beef) or beef particles are most preferably cut into pieces of approximate dimensions ½"× ¾"×1½" and the majority of particles comprise fat and lean sections which are naturally bonded together by connective tissue. The beef particles are temperature reduced by transfer through tunnel freezer 1502 such that the surface temperature of the fat components is lower (5° F.) than the surface temperature of the lean components, which is shown to be about 29° F., immediately following discharge from the freezer.

Figure 7:
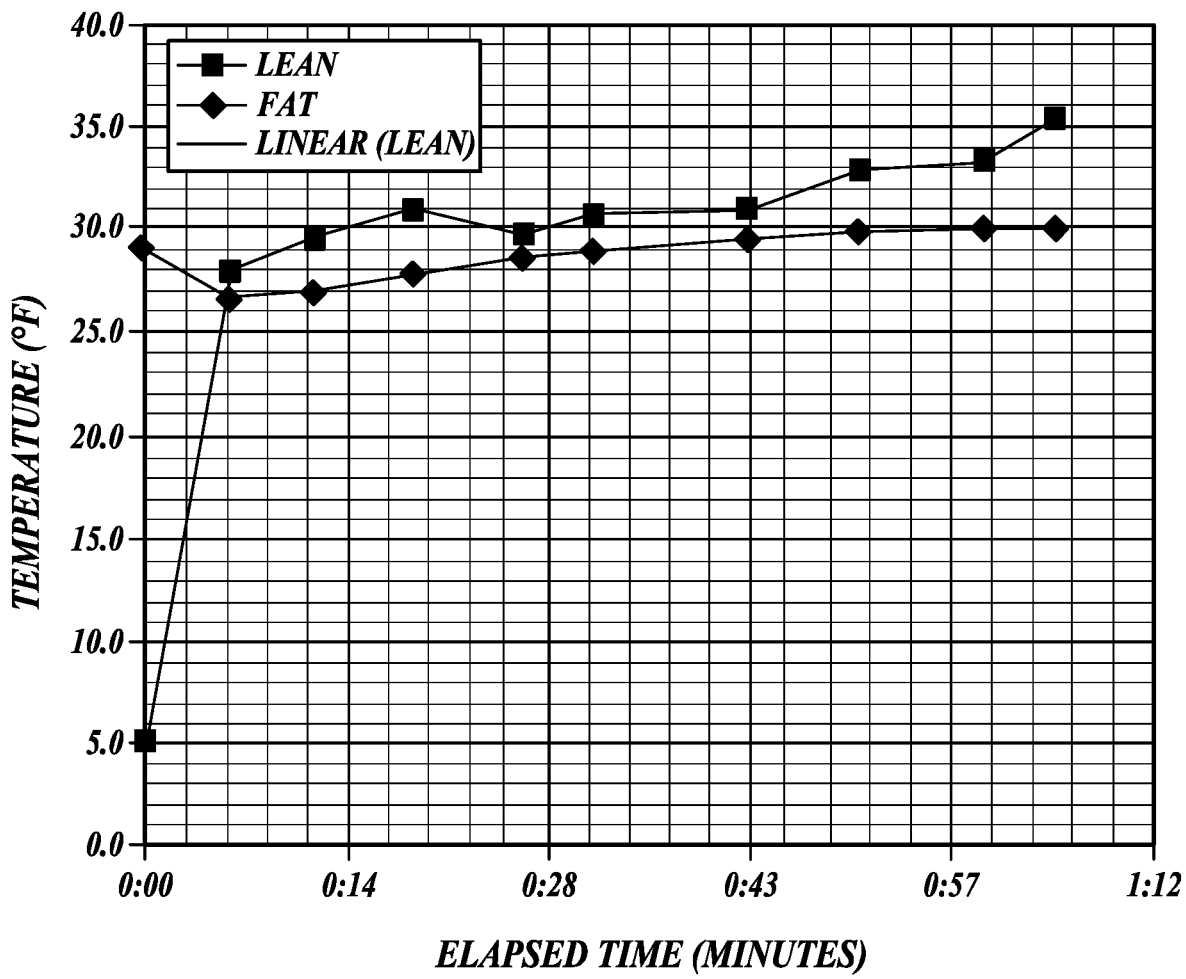
FIG. 7 is a chart of the difference in temperature versus elapsed time of the temperatures of fat and lean after exiting a freezer.

Referring to TABLE 2 above and to FIG. 7, the temperature of the lean and fat components are separately plotted against elapsed time. As can be seen, the temperature of the lean components is above the temperature of the fat components for about 5 minutes subsequent to discharge from the freezer and at about 6 minutes (after discharge from the freezer) the lean temperature is lower than the fat temperature.

The stream of temperature reduced beef is transferred in the direction shown by arrow 1504, from the freezer 1502 and directly through a specially designed and constructed device 1506, which clamps and distorts the particles profile or shape so as to clamp and compress, bend and distort the profile of the beef particles. As a result of distorting the particle profile, while the lean component is "flexible" but the fat component rigid (and friable), the major proportion of fat is broken into small pieces of tallow and in this way the process breaks the bond between the majority of the fat components and the lean components, however the particles of lean and fat remain together.

The temperature reduced stream of fat and lean particles is then transferred in the direction shown by arrow 1508 to hopper with rotary valve 1510, which facilitates transfer of the beef particle stream from ambient pressure to the pressurized conditions within the separation manifold 1512. Simultaneously, a temperature and mass flow controlled, measured quantity of carbonic acid (H2CO3) is also transferred from pressure vessel 1526, through coriolis measuring instrument 1528 and along a conduit represented by arrow 1544 into manifold 1512.

The two mass flow and temperature controlled streams of beef particles and carbonic acid are blended together in manifold 1512 and the temperatures rapidly equilibrate. Initially, however, the frozen condition of the lean and fat result in both solids, floating. Any heavy, bone fragments, which are unaffected by the water freezing temperatures, of the fat and lean solids sink immediately to the lower most location in the manifold it can fall to, which is arranged to be located at the base of the vertical lean, fat, and carbonic acid mixing column located directly beneath the hopper 1510 and rotary valve.

As the blend of solids and liquid carbonic acid transfer along the initially horizontal manifold conduit 1512, temperature equilibration between the solids and liquid increases density of the high water content lean beef as the formerly frozen water thaws and shrinks. The lean and fat solids quickly separate as temperature equilibration occurs, causing the density of lean to increase causing the fat and lean solids to diverge as they are carried with the flow of low pH carbonic acid. The fat remains buoyant, carried by the liquid and the lean particles fall to the lowermost section of the conduit through which they are still propelled along the horizontal conduit by the flow of liquid. The separation manifold is constructed so that immediately following temperature equilibration of the particles, a conduit connected directly to the underside of the horizontal conduit and extending downward, allows the lean particles to be separated from the main stream. An opposing conduit, attached directly to the upper side of the horizontal conduit, allows the fat particles to diverge upwardly and in this way the fat and lean particles are divided into two streams wherein the lean particles follow a conduit which becomes 1531 and the fat particles follow a path that connects directly to conduit 1514.

Enclosed conduit 1531 includes a coriolis measuring instrument 1530 through which the entire stream of liquids and solids carried by the conduit 1531 is transferred. Conduit 1531 connects directly to a positive displacement pump 1524 which controls mass flow there through. The fat stream carried via conduit 1514 is transferred via coriolis measuring instrument 1513 and to positive displacement pump 1515.

Two decanter style centrifuges 1532 and 1519 are conveniently located so as to allow direct connection of 1531, which is carrying the lean stream, to centrifuge 1532 and conduit 1514 connects to centrifuge 1519. Centrifuge 1532 is positioned to allow discharge of the lean component, after separation from the liquid portion of the stream, directly onto a continuous conveyor 1534, which also includes a weighing station. Similarly, centrifuge 1519 is positioned to allow discharge of the fat component after separation from the liquid portion of the stream, directly onto a continuous conveyor 1521, which also includes a weighing station. The lean stream is carried in the direction shown by arrow 1536 and continuously weighed as it is carried toward the collection conveyor 1550, and the fat stream carried by weighing conveyor 1521 is weighed as it is carried toward the collection conveyor 1550. A Coriolis measuring device 1538 is arranged to measure the quantity of liquid separated from the lean stream carried by 1531 and transferred through discharge pipe 1522 by centrifuge 1532, and the liquid separated from the fat stream carried by 1514 and separated by centrifuge 1519 then transferred via conduit 1516 is measured by coriolis 1517. Coriolis measuring device 1528 is arranged to measure the quantity of water added to the combined stream transferred via separation manifold 1512, and, in this way, the quantity of water remaining with the lean solids discharged from centrifuge 1532 can be determined by subtraction after measuring the content of the fat stream carried by 1514 in coriolis 1513 and the quantity of separated liquid discharged via 1516 and through coriolis 1517, thereby enabling determination of the lean content of the lean stream deposited by centrifuge 1532 onto conveyor 1534.

Coriolis measuring device 1530 continuously measures temperature, mass flow and water content of the stream carried by 1531 and Coriolis measuring device 1513 continuously measures temperature, mass flow and water content of the stream carried by conduit 1514.

The quantity of fat deposited onto conveyor 1521 is already known by subtracting the quantity of liquids measured by coriolis 1517 from the mass flow of matter measured by coriolis 1513. In this way a measured quantity of fat can be returned to the lean stream carried by conveyor 1534 by restricting the quantity of fat (tallow) carried on conveyor 1521 with the balance discharged in the direction shown by 1518. In this way, the recombined lean and fat streams can be measured so as to produce a stream of selected fat content boneless beef carried along conveyor 1550.

A method includes preparing diced beef pieces having been completely frozen to a temperature below 27 F and most preferably to about 15 F or lower, such that the consistency of the frozen beef pieces is hard but is not frozen to a temperature so low that the pieces resist crushing. The treatment comprises the application of a crushing force most preferably from opposing sides of the frozen beef and in a way that traps the beef pieces between, for example, a pair of horizontally opposed, counter rotating, rigid rollers that apply a crushing force greater than 50 psi to the beef pieces and with the rollers rotating such that when the frozen beef is dropped into the space between the rollers, the space is about half the size of the diced beef pieces and the rollers rotate so as to carry the frozen beef in a downward direction. This treatment is arranged to size reduce the frozen diced beef to particulates wherein the frozen fat has fractured and crumbled into smaller crumb like particulates and separated from the larger pieces of lean beef. The diced beef is compressed such that the fat fractures and breaks into smaller particulates that are generally smaller than the lean component, which, due to its fibrous properties, resists fracturing and tends to remain unaffected by the crushing force. Following crushing the stream of beef particulates comprises pieces of fat that are substantially fatty adipose tissue with no visible lean attached, while the lean particulates are mostly larger than the fat particulates and comprise mostly lean after the fat has fractured into crumbs and fallen away from the lean. The beef stream is then combined. with fluid that comprises filtered, clean water, or carbon dioxide and water, carbonic acid (or liquid carbon dioxide), or any suitable organic acid such as ascorbic acid, acetic acid, per-acetic acid, acidified sodium chlorite The beef and fluid are transferred into a vessel. The beef particulates comprise relatively light fat and heavy lean and even heavier bone fragment components, however until the temperature of the frozen water containing lean beef particulates has equilibrated (with the fluid), at a temperature above the freezing point of the water containing lean beef particulates, when frozen, the lean beef will float, suspended in the fluid, but will sink after the temperature of the lean particulates has equilibrated at above its freezing point. This provides a window of opportunity to collect any bone fragments, unaffected by freezing, that will sink before the lean beef particulates and can therefore be isolated in the lowest separation vessel compartment by closing a gate valve between the lowest vessel compartment and the upper enclosures and apparatus. The components that are predominantly lean beef will, after equilibrating at a temperature above the freezing point of lean beef, settle to the bottom of the fluid and components that are predominantly fat will rise to the surface of the fluid. The separated components comprising predominantly lean beef can be removed from the fluid as a reduced fat content beef product. The method can be practiced with any material containing fat, including plants and animals.

While illustrative embodiments have been illustrated and described, it will be appreciated that various changes can be made therein without departing from the spirit and scope of the invention.

The invention claimed is:

1. A method for the separation of fat from meat, comprising:
   (a) providing individual pieces of meat containing lean and fat;
   (b) subjecting the individual pieces of meat to cooling for a time sufficient to produce a difference in temperature between the fat and lean, wherein the fat is cooled such that the fat is friable and crumbles into finer particulates when subjected to a crushing force and the lean is cooled to a higher temperature than the fat and the lean is able to withstand a similar crushing force without substantially crumbling into smaller particulates; and
   (c) with the fat and lean at the temperatures produced in step (b), subjecting the individual pieces of meat to a crushing force to separate particulates of fat from the individual pieces of meat.

2. The method of claim 1, wherein, after subjecting the individual pieces of meat to cooling, the temperature at the surface of the fat is 5° F. to 10° F.

3. The method of claim 1, wherein, after subjecting the individual pieces of meat to cooling, the temperature at the surface of the lean is 16° F. to about 34° F.

4. The method of claim 1, wherein the time of cooling the individual pieces of meat is approximately 2 minutes to 3 minutes.

5. The method of claim 1, further comprising transferring the individual pieces of meat and separated particulates of fat to a vessel and filling the vessel with a fluid comprising, at least, carbon dioxide, and allowing the particulates of fat to rise in the fluid and allowing the individual pieces of meat to sink in the fluid, followed by collecting the fat and the individual pieces of meat.

6. The method of claim 5, further comprising allowing bone to sink in the fluid to a lower elevation as compared to an elevation attained by the individual pieces of meat.

7. The method of claim 1, further comprising transferring the individual pieces of meat and separated particulates of fat within a conduit filled with a fluid comprising, at least, carbon dioxide, and allowing the particulates of fat to rise in the fluid and allowing the individual pieces of meat to sink in the fluid while the fluid travels in the conduit, followed by collecting the fat and the individual pieces of meat.

8. The method of claim 1, further comprising subjecting the individual pieces of meat to a crushing force produced by intermeshing teeth on a continuous conveyor belt to separate particulates of fat from the individual pieces of meat.

9. The method of claim 1, further comprising, after separating the particulates of fat from the individual pieces of meat, combining a measured portion of the fat particulates with a measured portion of the individual pieces of meat to achieve a predetermined fat content for the meat.

10. The method of claim 1, further comprising cutting raw meat to a size not exceeding 2 inches in any dimension to produce the individual pieces of meat of step (a).

11. The method of claim 10, wherein, after producing the individual pieces of meat, the pieces are cooled to minimize agglomeration of pieces into frozen masses comprising a plurality of pieces.

12. The method of claim 1, wherein the individual pieces of meat in step (c) comprise predominantly lean meat.

13. The method of claim 1, further comprising contacting the separate particulates of fat and individual pieces of meat of step (c) with a flowing liquid comprising, at least, carbonic acid, in a conduit, and allowing frozen water in the individual pieces of meat to thaw and increase in density, which causes the individual pieces of meat to fall in the flowing liquid, while the fat particulates are buoyant in the liquid, and collecting the individual pieces of meat in a lower conduit of a manifold and collecting the fat particulates in an upper conduit of the manifold.

14. The method of claim 13, further comprising separating the liquid from the individual pieces of meat and fat particulates, weighing the fat, and combining a portion of the fat with the individual pieces of meat to produce a meat product of predetermined fat content.

15. The method of claim 14, further comprising centrifuging the individual pieces of meat and fat particulates to remove the liquid, weighing the individual pieces of meat in a first conveyor, and weighing the fat particulates in a second conveyor.

* * * * *